US012620766B2

(12) United States Patent
Sipes, Jr. et al.

(10) Patent No.: US 12,620,766 B2
(45) Date of Patent: May 5, 2026

(54) COUNTER PUMPING A LARGE MODE AREA FIBER LASER

(71) Applicant: OPTICAL ENGINES, INC., Colorado Springs, CO (US)

(72) Inventors: Donald Lee Sipes, Jr., Colorado Springs, CO (US); Jason Tafoya, Colorado Springs, CO (US); Brian Michael Schulz, Colorado Springs, CO (US); James Lefort, Colorado Springs, CO (US); Daniel Scott Schulz, Colorado Springs, CO (US)

(73) Assignee: OPTICAL ENGINES, INC., Colorado Springs, CO (US)

( * ) Notice: Subject to any disclaimer, the term of this patent is extended or adjusted under 35 U.S.C. 154(b) by 1059 days.

(21) Appl. No.: 17/576,431

(22) Filed: Jan. 14, 2022

(65) Prior Publication Data

US 2022/0173567 A1 Jun. 2, 2022

Related U.S. Application Data

(63) Continuation-in-part of application No. PCT/US2020/020170, filed on Feb. 27, 2020, and a
(Continued)

(51) Int. Cl.
*H01S 3/094* (2006.01)
*H01S 3/067* (2006.01)

(52) U.S. Cl.
CPC .... *H01S 3/094019* (2013.01); *H01S 3/06745* (2013.01); *H01S 3/094003* (2013.01); *H01S 3/094053* (2013.01); *H01S 3/094057* (2013.01)

(58) Field of Classification Search
None
See application file for complete search history.

(56) References Cited

U.S. PATENT DOCUMENTS 4,900,114 A 2/1990 Mortimore et al.
6,236,793 B1 5/2001 Lawrence et al.
(Continued)

FOREIGN PATENT DOCUMENTS

JP 2015040992 A1 3/2015
WO 2012162926 A1 12/2012
(Continued)

OTHER PUBLICATIONS

International Search Report and Written Opinion for co-pending International Application No. PCT/US2020/20170, dated Jun. 24, 2020.
(Continued)

*Primary Examiner* — Eric L Bolda
(74) *Attorney, Agent, or Firm* — Leydig, Voit & Mayer, Ltd.

(57) ABSTRACT

A fiber support assembly includes: a first glass tube, wherein the first glass tube is attached to a microlens or lenslet of a microlens or lenslet array; a second glass tube at least partially disposed within the first glass tube; and a gain fiber disposed within the second glass tube, wherein the gain fiber has a first tapered end cap, and wherein the gain fiber with the first tapered end cap is aligned to the microlens or lenslet attached to the first glass tube. The fiber support assembly may further include: a pump fiber disposed within the second glass tube, wherein the pump fiber has a second tapered end cap; and a reflector configured to receive counter-pumping light from the pump fiber and direct the counter-pumping light to the first tapered end cap of the gain fiber.

20 Claims, 37 Drawing Sheets

Related U.S. Application Data continuation-in-part of application No. 16/513,191, filed on Jul. 16, 2019, now Pat. No. 11,342,723.

(60) Provisional application No. 63/183,892, filed on May 4, 2021, provisional application No. 62/794,257, filed on Jan. 18, 2019, provisional application No. 62/698,489, filed on Jul. 16, 2018.

(56) References Cited

U.S. PATENT DOCUMENTS

| | | | |
|---|---|---|---|
| 6,275,627 B1 | 8/2001 | Wu | |
| 6,324,326 B1 | 11/2001 | Dejneka et al. | |
| 6,826,335 B1 | 11/2004 | Grudinin et al. | |
| 8,089,689 B1 | 1/2012 | Savage-Leuchs | |
| 8,773,755 B2 | 7/2014 | Nishihara et al. | |
| 9,130,340 B1 * | 9/2015 | Polynkin | H01S 3/06754 |
| 9,667,023 B2 | 5/2017 | Fomin et al. | |
| 9,917,411 B2 | 3/2018 | Tafoya | |
| 10,211,593 B1 | 2/2019 | Lingvay et al. | |
| 10,348,051 B1 | 7/2019 | Shah et al. | |
| 2002/0057873 A1 * | 5/2002 | Wu | G02B 6/262 385/33 |
| 2002/0110322 A1 | 8/2002 | Brun et al. | |
| 2003/0016441 A1 | 1/2003 | Leplingard et al. | |
| 2003/0063852 A1 * | 4/2003 | Schiffer | G02B 6/32 385/33 |
| 2005/0122574 A1 | 6/2005 | Kakui et al. | |
| 2007/0115541 A1 | 5/2007 | Rogers et al. | |
| 2008/0219299 A1 | 9/2008 | Lewis | |
| 2009/0080469 A1 | 3/2009 | Nikolajsen | |
| 2010/0195678 A1 | 8/2010 | Kuka | |
| 2011/0032604 A1 | 2/2011 | Rothenberg et al. | |
| 2011/0141758 A1 | 6/2011 | Seo et al. | |
| 2011/0249321 A1 | 10/2011 | Savage-Leuchs | |
| 2013/0301663 A1 | 11/2013 | Clowes et al. | |
| 2014/0064305 A1 | 3/2014 | Sipes, Jr. et al. | |
| 2015/0010025 A1 | 1/2015 | Tagliaferri et al. | |
| 2015/0138630 A1 | 5/2015 | Honea et al. | |
| 2016/0380403 A1 | 12/2016 | Sipes | |
| 2017/0085052 A1 * | 3/2017 | Zhao | H01S 3/094003 |
| 2017/0117680 A1 * | 4/2017 | He | H01S 3/1115 |
| 2017/0214209 A1 | 7/2017 | Tafoya et al. | |
| 2020/0099192 A1 | 3/2020 | Sipes, Jr. | |
| 2023/0098573 A1 * | 3/2023 | Cao | H01S 3/0085 359/341.1 |

FOREIGN PATENT DOCUMENTS

| | | |
|---|---|---|
| WO | WO 2015/117128 A1 | 8/2015 |
| WO | WO 2021/011031 A1 | 1/2021 |

OTHER PUBLICATIONS

U.S. Appl. No. 15/192,389, filed Jun. 24, 2016.

U.S. Appl. No. 16/513,191, filed Jul. 16, 2019.

Supplementary European Search Report from co-pending European Application No. 22799261, dated Feb. 27, 2025.

International Preliminary Report on Patentability and Written Opinion dated Nov. 16, 2023 for co-pending International Application No. PCT/US2022/022613, filed on Mar. 30, 2023.

International Search Report and Written Opinion dated Aug. 1, 2022, for co-pending International Application No. PCT/US2022/22613, filed Mar. 30, 2022, (14 pages total).

Goodno, et al., "Perturbative Analysis of Coherent Combining Efficiency with Mismatched Lasers", *Optics Express*, vol. 18, No. 24, p. 25403 (Nov. 22, 2010).

* cited by examiner 127 3.2mm +/- 0.5um OD
Selected fused Zirconia
Telecom Grade Sleeves with
2.5um +/-0.0 um ID ~ 500um dia
Interstitial spaces for
routing 105/125um.
15NA 100W to 200W
976nm wavelength
stabilized pump light Collimating lens selected to maximize fill factor and is centered on tube Tube diameters are processed to under 5um tolerance Counter Pumped Tapered End Cap (CPTEC) assembly is adjustable to provide collimation and collinearity to less than 100uRad Front View Close-up: Tube Assembly

Figure 16E

Overall View

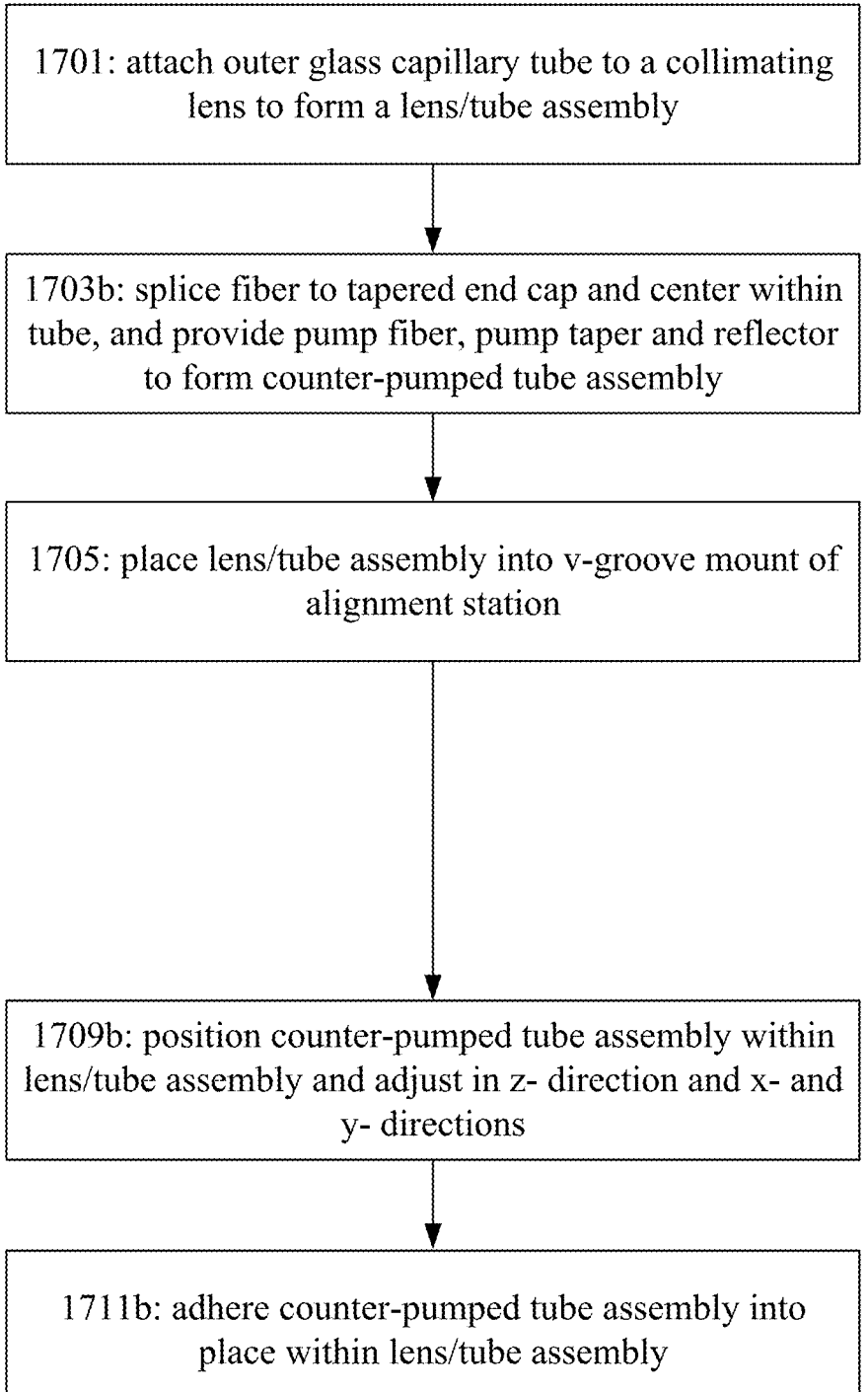

1701: attach outer glass capillary tube to a collimating lens to form a lens/tube assembly 1703b: splice fiber to tapered end cap and center within tube, and provide pump fiber, pump taper and reflector to form counter-pumped tube assembly 1705: place lens/tube assembly into v-groove mount of alignment station 1709b: position counter-pumped tube assembly within lens/tube assembly and adjust in z- direction and x- and y- directions 1711b: adhere counter-pumped tube assembly into place within lens/tube assembly

Figure 17B

COUNTER PUMPING A LARGE MODE AREA FIBER LASER

CROSS-REFERENCE TO RELATED APPLICATIONS

This application is a continuation-in-part of International Patent Application No. PCT/US2020/020170, filed on Feb. 27, 2020, which claims the benefit of U.S. patent application Ser. No. 16/513,191, filed on Jul. 16, 2019.

This application is also a continuation-in-part of U.S. patent application Ser. No. 16/513,191, filed on Jul. 16, 2019, which claims the benefit of U.S. Provisional Application No. 62/698,489, filed on Jul. 16, 2018, and U.S. Provisional Application No. 62/794,257, filed on Jan. 18, 2019.

This application also claims the benefit of U.S. Provisional Application No. 63/183,892, filed on May 4, 2021.

The disclosures of all of the foregoing applications are hereby incorporated by reference in their entireties.

STATEMENT REGARDING FEDERALLY SPONSORED RESEARCH OR DEVELOPMENT

This invention was made with Government support under contract SBIR Phase 2 Contract SC0015905 awarded by the Department of Energy. The Government has certain rights in this invention.

BACKGROUND

Fiber lasers are becoming increasingly deployed in industrial, scientific, medical, and defense applications due to their high efficiency, robust and reliable construction, and their relatively low system size and weight. Pulsed fiber lasers, such as ultrafast fiber lasers, are of interest. Furthermore, pulsed fiber lasers can create femtosecond (fs) level pulses in small, rugged and reliable packages. Fiber nonlinearities, such as stimulated Brillouin scattering (SBS), Raman scattering, and self-phase modulation (SPM), act as impediments to realizing higher peak powers and even shorter pulse widths.

SUMMARY

In an exemplary embodiment, the present disclosure provides a fiber optic assembly. The fiber optic assembly includes: a gain fiber configured to output signal light; a first taper corresponding to the gain fiber, wherein the first taper is configured to expand the signal light output by the gain fiber; and a reflector configured to receive counter-pumping light and direct the counter-pumping light into the first taper. The first taper is further configured to receive the counter-pumping light and focus the counter-pumping light as the counter-pumping light propagates towards the gain fiber.

In a further exemplary embodiment, the reflector is disposed relative to the first taper such that the reflector does not impede the expanded signal light output from the first taper.

In a further exemplary embodiment, the fiber optic assembly further includes a pump fiber and a second taper corresponding to the pump fiber for carrying the counter-pumping light to the reflector.

In a further exemplary embodiment, the fiber optic assembly further includes a support structure having a first groove or channel for holding the gain fiber and the first taper and a second groove or channel for holding the reflector.

In a further exemplary embodiment, the reflector is part of a dichroic beam splitter assembly and comprises a dichroic coating for reflecting the counter-pumping light and passing the signal light.

In a further exemplary embodiment, the gain fiber is spliced to the first taper.

In a further exemplary embodiment, the first taper is a tapered fiber or a tapered glass rod.

In a further exemplary embodiment, a first end of the first taper interfacing with the gain fiber has a first diameter corresponding to a cladding diameter of the gain fiber, and a second end of the first taper interfacing with the reflector has a second diameter larger than the first diameter.

In a further exemplary embodiment, the first taper comprises: a first section having a diameter which increases from a first value to a second value over the length of the first section; and a second section having a constant diameter.

In a further exemplary embodiment, the fiber optic assembly further includes an antireflective coating at an interface between the first taper and the reflector.

In a further exemplary embodiment, the gain fiber is a large mode area (LMA) fiber or a photonic crystal fiber (PCF).

In a further exemplary embodiment, the gain fiber is a composite fiber comprising a photonic crystal fiber (PCF) and a large mode area (LMA) fiber with a mode adapter interfacing the PCF fiber to the LMA fiber.

In another exemplary embodiment, the present disclosure provides a fiber amplifier system. The fiber amplifier system includes: an amplifier front end configured to pre-amplify light from a seed source and output the pre-amplified light to a first section of gain fiber; a first mode adapter configured to connect the first section of gain fiber to a second section of gain fiber; a laser diode pump for providing counter-pumping light through a pump fiber; and a reflector assembly for directing the counter-pumping light from the pump fiber towards the first and second sections of gain fiber.

In a further exemplary embodiment, the reflector assembly comprises a first taper, a reflector, and a second taper.

In a further exemplary embodiment, the second section of gain fiber comprises a photonic crystal fiber (PCF).

In a further exemplary embodiment, the fiber amplifier system further includes a second mode adapter configured to connect the second section of gain fiber to a third section of gain fiber, wherein the third section of gain fiber comprises a photonic crystal fiber (PCF).

In a further exemplary embodiment, the fiber amplifier system further includes a third mode adapter configured to connect the third section of gain fiber to a fourth section of gain fiber.

In yet another exemplary embodiment, the present disclosure provides a fiber amplifier array. The fiber amplifier array includes: a plurality of sleeves, wherein each sleeve comprises a gain fiber and a first taper; a plurality of interstitial spaces disposed between respective sleeves of the plurality of sleeves; and a plurality of reflectors, wherein each reflector is configured to direct counter-pumping light from at least respective one interstitial space to at least one respective first taper.

In a further exemplary embodiment, the plurality of sleeves are arranged to form a 1-D array, a 2-D square array, or a 2-D hexagonal array.

In a further exemplary embodiment, at least one reflector of the plurality of reflectors is configured to direct counter-pumping light from multiple interstitial spaces to multiple first tapers.

In yet another exemplary embodiment, the present disclosure provides a fiber support assembly. The fiber support assembly includes: a first glass tube, wherein the first glass tube is attached to a microlens or lenslet of a microlens or lenslet array; a second glass tube at least partially disposed within the first glass tube; and a gain fiber disposed within the second glass tube, wherein the gain fiber has a first tapered end cap, and wherein the gain fiber with the first tapered end cap is aligned to the microlens or lenslet attached to the first glass tube.

In a further exemplary embodiment, the fiber support assembly further includes: a third glass tube disposed between the first glass tube and the second glass tube.

In a further exemplary embodiment, the fiber support assembly further includes: a pump fiber disposed within the second glass tube, wherein the pump fiber has a second tapered end cap; and a reflector configured to receive counter-pumping light from the pump fiber and direct the counter-pumping light to the first tapered end cap of the gain fiber.

In a further exemplary embodiment, the reflector is a dichroic mirror.

In a further exemplary embodiment, the gain fiber is adjustable for alignment based on movement of the second glass tube relative to the first glass tube.

In a further exemplary embodiment, the gain fiber is configured to be aligned to the microlens or lenslet using an alignment station with a camera.

In yet another exemplary embodiment, the present disclosure provides a system. The system includes: a microlens or lenslet array; and a plurality of fiber support assemblies, wherein each fiber support assembly of the plurality of fiber support assemblies comprises: a first glass tube, wherein the first glass tube is attached to a respective microlens or lenslet of the microlens or lenslet array; a second glass tube at least partially disposed within the outer glass capillary tube; and a gain fiber disposed within the second glass tube, wherein the gain fiber has a first tapered end cap, and wherein the gain fiber with the first tapered end cap is aligned to the respective microlens or lenslet attached to the first glass tube.

In a further exemplary embodiment, each fiber support assembly of the plurality of fiber support assemblies further includes: a pump fiber disposed within the second glass tube, wherein the pump fiber has a second tapered end cap; and a reflector configured to receive counter-pumping light from the pump fiber and direct the counter-pumping light to the first tapered end cap of the gain fiber.

In a further exemplary embodiment, the system further includes: a respective seed or source, a respective amplifier front end, and one or more respective mode adapters connected to a respective gain fiber.

In a further exemplary embodiment, the system further includes: a respective counter-pumping source connected to a respective pump fiber.

In a further exemplary embodiment, the plurality of fiber support assemblies are disposed in a triangular array.

In a further exemplary embodiment, the system further includes: a v-groove support structure configured to hold the triangular array of fiber support assemblies.

In a further exemplary embodiment, the plurality of fiber support assemblies are disposed in a hexagonal array or a square array.

In a further exemplary embodiment, the plurality of fiber support assemblies are stacked on one another to form an aligned array of fiber support assemblies.

In yet another exemplary embodiment, the present disclosure provides a method for forming an aligned fiber support assembly. The method includes: attaching a first glass tube to a microlens or lenslet of a microlens or lenslet array to form a lens/tube assembly; providing a second glass tube at least partially disposed within the first glass tube; aligning, using an alignment station and a camera, a beam output from a gain fiber having a tapered end cap to the microlens or lenslet, wherein the gain fiber having the tapered end cap is disposed within the second glass tube; and fixing the gain fiber relative to the second glass tube and/or the second glass tube relative to the lens/tube assembly.

In a further exemplary embodiment, attaching the first glass tube to the microlens or lenslet includes: centering the microlens or lenslet relative to the first glass tube.

In a further exemplary embodiment, aligning the beam output from the gain fiber having the tapered end cap to the microlens or lenslet includes: placing the lens/tube assembly into a v-groove mount of the alignment station, wherein the v-groove mount of the alignment station is aligned to the camera; and adjusting a position of the gain fiber having the tapered end cap and/or a position of the second glass tube.

In a further exemplary embodiment, the method further includes: providing a third glass tube between the first and second glass tubes.

In a further exemplary embodiment, the method further includes: providing a pump fiber disposed within the second glass tube, wherein the pump fiber has a second tapered end cap, and a reflector configured to receive counter-pumping light from the pump fiber and direct the counter-pumping light to the first tapered end cap of the gain fiber.

BRIEF DESCRIPTION OF THE DRAWINGS

FIGS. 16B-16G depict schematic diagrams of an exemplary implementation of the alignment station of FIG. 16A.

FIGS. 17A-17B are flowcharts depicting exemplary processes for alignment and assembly of a single channel fiber support.

DETAILED DESCRIPTION

Ameliorating the effects of SBS, Raman scattering, and SPM generally involves utilizing rare-earth-doped gain fibers with large mode area (LMA) fiber cores where the light is guided and amplified. It can be desirable for these ultrafast fiber laser systems to employ all-fiber architectures whereby the only free space beam resides at the output of the fiber laser. Also, ultrafast fiber lasers and fiber lasers in general perform more efficiently and with higher non-linear thresholds when the pump light propagates in the opposite direction to the signal propagation (referred to as "counter pumping").

Ultrafast fiber lasers are sensitive to SPM. This effect usually occurs when a signal pulse is at its highest intensity at the output end of a fiber laser. In monolithic or all-fiber co-pumped configurations and in free space counter pumped arrangements, the amount of fiber past the amplifying gain fiber can be very short, e.g., under 10 mm. While having a short amount of fiber after the gain fiber is advantageous, co-pumped amplifiers suffer from lower efficiency and lower non-linearity thresholds compared to counter pumped amplifiers. Counter pumped configurations can achieve 3 dB more average power output or intensity before onset of non-linearity compared to co-pumped configurations.

Conventional counter pumped ultrafast amplifiers have large fiber pump coupling optics and mounting hardware and require large, stable and heavy optical benches for holding the pump fibers and guiding the pump light into the end of the fiber amplifier. Alternatively, monolithic counter pumped fiber lasers can have up to 20 cm of fiber past the gain fiber for the fiber pump combiner, the output fiber, and any other transition fibers. An indicator commonly used for characterizing pulsed lasers is the "B Integral," which corresponds to the integral of the intensity times the nonlinear index. Having 20 cm of non-gain fiber adds to the B Integral without adding any value from an amplification standpoint. Therefore, a monolithic counter pumped fiber laser designed as such has a disadvantage of increasing pulse width.

Embodiments of the disclosure provide counter pumped amplifier architectures having the compactness and reliability of monolithic designs. Embodiments of the disclosure also achieve counter pumping in an architecture where a large number of ultrafast fiber amplifiers are contained with their outputs in a closely packed 2-D array. Embodiments of the disclosure avoid having free space and therefore avoid the need for heavy optical benches for holding components together.

Figure 1:
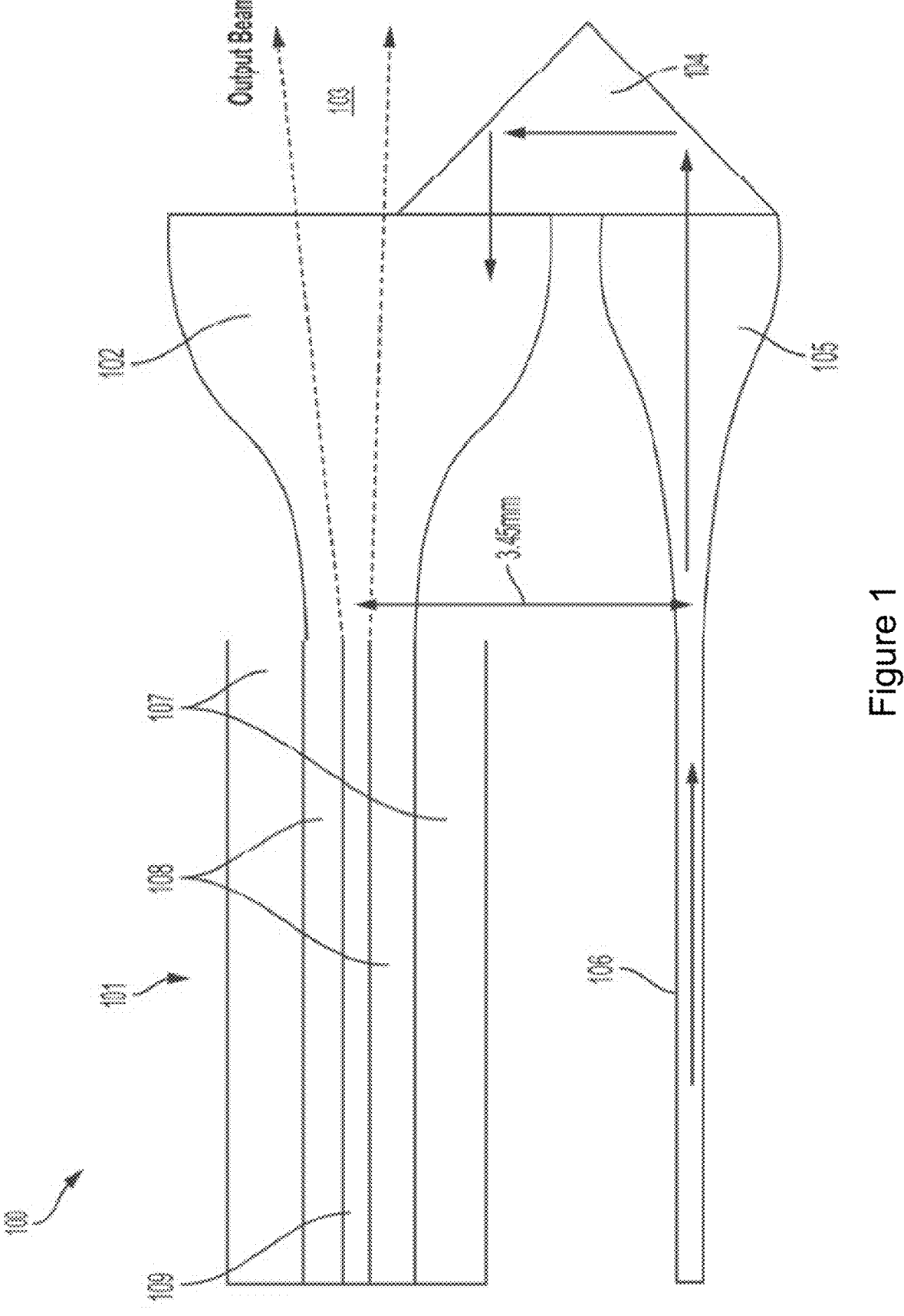
FIG. 1 illustrates a fiber optic assembly for counter pumping according to an embodiment of the disclosure.

FIG. 1 illustrates a fiber optic assembly 100 for counter pumping according to an embodiment of the disclosure. The fiber optic assembly 100 can be used in a fiber laser (e.g., having fiber Bragg grating (FBG) mirrors on both ends of the gain fiber to create an oscillator) or a fiber amplifier application (e.g., having a signal on the input). In an embodiment, the fiber optic assembly 100 comprises a double-clad gain fiber 101 of an amplifier. The gain fiber 101 can be an LMA fiber with a core 109, a pump cladding 108 (also called an "inner cladding"), and a buffer 107 (also called an "outer cladding"). The core 109 of the gain fiber 101 may be rare-earth-doped. The buffer 107 may be made of glass or polymer, or the buffer 107 could be removed or be basically air (typically for practical purposes having air as the buffer 107 would only be feasible for a few cm due to concerns about contamination). The diameter of the core 109 of the gain fiber 101 can be classified as LMA when the diameter is substantially larger than the 6 μm to 9 μm core diameters found in single mode fibers (SMF). The substantially larger LMA diameters can be achieved through a number of ways, e.g., by precise control of index of refraction (index) between the core (e.g., the core 109) and the cladding (e.g., pump cladding 108) of the fiber, or through a microstructured fiber, such as a photonic crystal fiber (PCF), a photonic bandgap fiber (PBG), or through other methods, such as a Chirally-Coupled Core (3C) fiber. These aforementioned modes of achieving LMA type fibers allow for large propagating modes in the fiber favorable to the lowest order or fundamental propagating mode of the fiber. The fiber optic assembly 100 in FIG. 1 further includes a first taper 102 (e.g., a tapered fiber or a tapered glass rod). The first taper 102 has a diameter on its smaller end that matches the diameter of the pump cladding 108 of the gain fiber 101.

As depicted in FIG. 1, the tapered design of the first taper 102 allows the amplified signal light out of the core 109 of the gain fiber 101 to expand naturally as determined by the numerical aperture (NA) of the gain fiber 101. The output beam 103 from the gain fiber 101 exits the core 109, grows within the first taper 102, and exits the first taper 102. The first taper 102 can be tapered either by thermal tapering or by acid etching such that pump light entering from its right is guided by the first taper 102 to the pump cladding 108 of the gain fiber 101. Both the pump cladding 108 and the buffer 107 may form a guiding structure for pump light with respect to the gain fiber 101.

Pump light is delivered to the gain fiber 101 in a counter pumping configuration from a pump diode by way of a pump fiber 106. A second taper 105 increases the diameter of the core of pump fiber 106 and reduces the NA in accordance with the law of conservation of brightness. The second taper 105 can also be a tapered fiber or a tapered glass rod. The expanded pump light out of the second taper 105 is directed through a reversing prism 104 to direct the pump light through the first taper 102 into the pump cladding 108 of the gain fiber 101. The reversing prism 104 may be a commercially available micro prism utilizing total internal reflection to both reverse and offset the pump light. The sizes and orientations of the second taper 105, the first taper 102, and the reversing prism 104 are configured such that the output beam 103 is not impeded by the reversing prism 104.

The fiber optic assembly 100 in FIG. 1 directs pump light from the pump fiber 106 into the gain fiber 101. As discussed above, the gain fiber 101 is double-clad and may include a rare-earth-doped core where the signal propagates and a pump cladding 108 that contains and propagates pump light. The pump light internally reflects and distributes around in the pump cladding 108, passing periodically through the rare-earth-doped core 109 where it is absorbed. Most double-clad fibers have cladding absorptions anywhere between 1 and 10 dB/m.

In conventional methods involving pulsed lasers with advanced large mode area gain fibers such as photonic crystal fibers, the pump light is coupled into the gain fiber using two lenses. One lens is positioned after the pump fiber to collimate the pump light, and the other lens is positioned near the gain fiber to focus the pump light into the gain fiber. Through the law of conservation of brightness, when light in a fiber is tapered such that the diameter increases, the numerical aperture (NA) decreases. In the embodiment of FIG. 1, the first and second tapers 102, 105 act as non-imaging lenses for collimating and focusing the light. As such, replacing conventional lenses with the first and second tapers 102, 105 provides a major difference because lenses image light while tapered fibers or tapered glass rods concentrate light.

In an exemplary implementation, the second taper 105 starts as a commercially available 400/440 μm 0.22 NA multimode fiber that is then tapered to a 105 μm core diameter and spliced to a 105/125 μm 0.15 NA pump fiber from the pump diode. Pump light from the diode is at 105 μm and 0.15 NA. The second taper 105 changes this to 400 μm and 0.05 NA. The first taper 102 takes this to 200 μm and 0.55 NA. The first taper 102 is a 1.5 mm/1.6 mm fiber tapered to 200 μm.

The expanding and concentrating process is governed through the etendue of the light, which corresponds to the NA times the diameter for an optical system that is symmetric cylindrically about the propagation axis. In an exemplary implementation, the pump light travels in a 105 μm fiber diameter with an NA of 0.15. The etendue is defined as the radius times the solid angle of the light emission, but in a cylindrically symmetric geometry, the etendue can be determined as the diameter times the NA. The pump diameter-NA product for the 105 μm fiber with 0.15 NA is 15.75. A double-clad gain fiber with a diameter of 200 μm with a NA of 0.55 provides a product of 110. Since 15.75 is less than 110, the pump light should be able to be focused into the gain fiber pump cladding with 100% efficiency. The tapers serve to exchange diameter for NA while preserving the pump diameter-NA product. In an embodiment, the second taper 105 takes the 105 μm/0.15 NA pump light from the pump fiber 106 to 400 μm/0.04 NA, and the first taper 102 takes the 200 μm/0.55 NA signal light from the gain fiber 101 to 1.6 mm/0.07 NA. Therefore, the output of the second taper 105 can be abutted against the first taper 102, and all the pump light will go into the pump cladding 108 of the gain fiber 101. The reversing prism 104 provides the convenience of placing the two fibers parallel to each other.

An advantage provided over conventional lens implementations is that lenses have to be positioned accurately and are susceptible to motion, but by using the geometry of the tapers, which may be tapered fibers or tapered glass rods, embodiments of the disclosure can very accurately and stably direct the pump light into the gain fiber. The fiber optic assembly 100 of FIG. 1 is amenable to a monolithic structure where the pump light completely or mostly does not leave the fiber, and all the fibers are spliced together.

Although not strictly monolithic, embodiments of the disclosure have properties associated with monolithic structures.

The fiber optic assembly 100 in FIG. 1, according to some embodiments of the disclosure, provides several advantages. For example, the first taper 102 positioned after the gain fiber 101 can be designed to be very short, e.g., about 5 mm to 10 mm. Very short glass lengths can minimize the amount of SPM experienced and can increase the non-linearity thresholds. Non-linearity thresholds are increased because, compared to light guided by fiber, the light entering the first taper 102 expands through diffraction instead of being confined by the structure of the gain fiber 101. To give another example, embodiments of the disclosure provide a compact design that is amenable to placing fiber amplifiers in densely packed 2-D arrays for coherent or wavelength combining. Furthermore, embodiments of the disclosure utilize an output taper, e.g., the first taper 102, that does not have light guiding properties. As such, the fiber optic assembly 100 can work with a number of different fibers without having to create specialty matching fibers.

FIG. 1 illustrates counter pumping with a single fiber, but it will be appreciated that the fiber optic assembly 100 in FIG. 1 can be adapted to accommodate multiple fiber pumps and reversing prisms surrounding a central beam. For example, in another exemplary embodiment, additional pump fiber(s), taper(s), and reversing prism(s) (similar to elements 106, 105 and 104 of FIG. 1, which are below output beam 103) can be added above and/or on the sides of output beam 103.

In an embodiment, the reversing prism 104 can be eliminated and the pump laser can be pointed directly at the output end of the first taper 102. With respect to FIG. 1, the reversing prism 104 can be removed and the second taper 105 and the pump fiber 106 are rotated 180 degrees and positioned at the bottom of the first taper 102.

In another exemplary embodiment, a second pump turning prism opposing the first one may be added, so as to double the available pumping power.

Multiple methods can be adopted to reduce or eliminate back reflections. For example, optically contacting the elements identified in FIG. 1 can eliminate back reflections. In another example, the elements may be fused together by heating the elements in an optical fiber splicing machine or equivalent device. Light is in "free space" between the second taper 105 and the reversing prism 104 (which may be on the order of microns apart), and between the reversing prism 104 and the first taper 102. Thus, methods for reducing back reflections at these two interfaces can involve putting anti-reflective (AR) coatings on these surfaces or putting them in optical contact (basically touching each other). Connections between the gain fiber 101 and the first taper 102 and between the second taper 105 and the pump fiber 106 are spliced and do not require elimination of back reflections.

In an embodiment, the gain fiber 101 is PCF rod fiber with polarization-maintaining characteristics having an 85 μm core diameter and a 250 μm pump cladding diameter. The first taper 102 is a 1.5 mm to 2 mm fused silica rod tapered to 250 μm and spliced to the PCF rod fiber. Adiabatic or near adiabatic taper of the first taper 102 transforms the 250 μm 0.55 NA pump cladding to a 1.5 mm 0.09 NA cladding. The pump fiber 106 is spliced to the second taper 105 that increases from the 105 μm 0.15 NA core diameter of the pump fiber 106 to a 400 μm 0.04 NA output. The reversing prism 104 has anti-reflective (AR) coating on its long face and is aligned such that the light from the pump fiber 106 goes into the gain fiber 101 with high efficiency.

Figure 2:
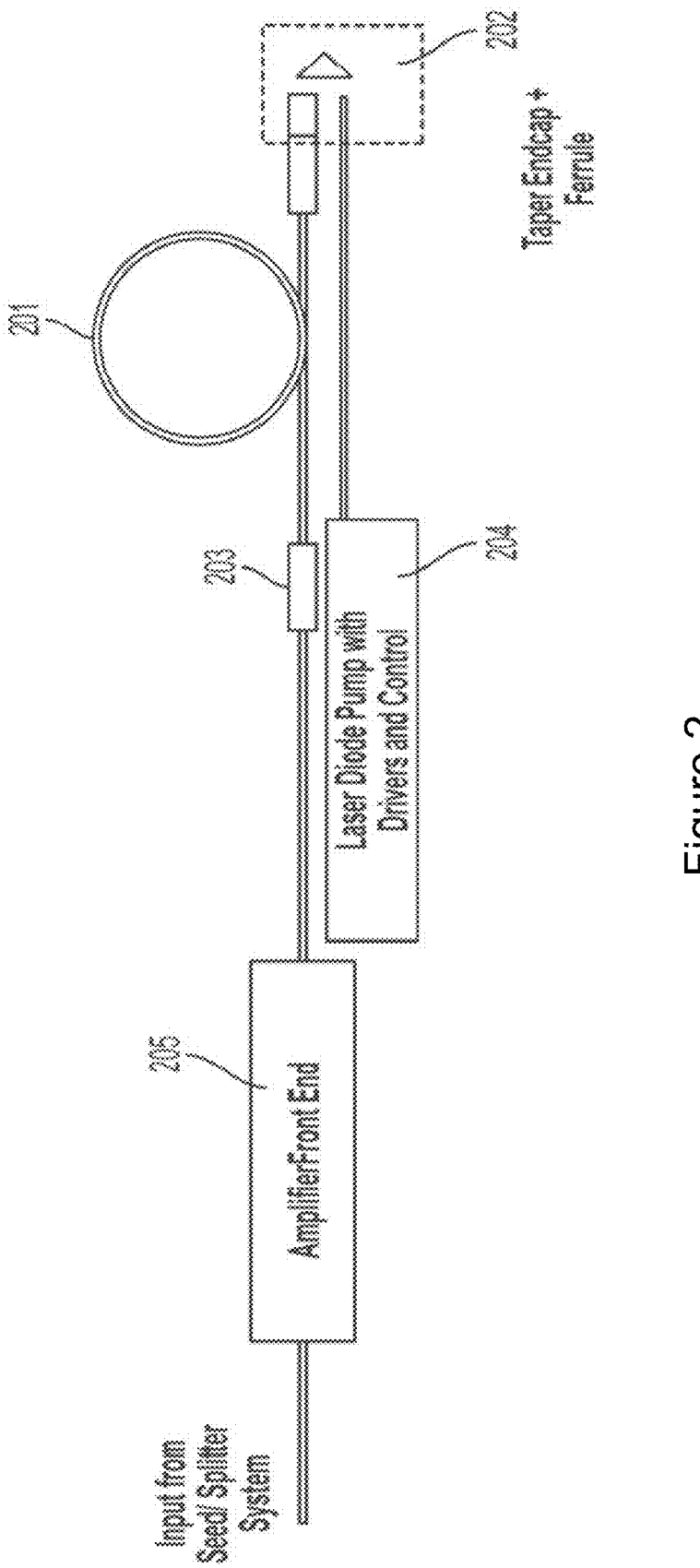
FIG. 2 illustrates an amplifier incorporating counter pumping according to an embodiment of the disclosure.

FIG. 2 illustrates an amplifier incorporating counter pumping according to an embodiment of the disclosure. In the amplifier, light from a seed source is pre-amplified in an amplifier front end 205 through a fiber, e.g., a single mode fiber. A mode adapter 203 transforms the core light to match a larger core PCF fiber 201. The larger core PCF fiber 201 can be, for example, a 40 μm Yb-doped polarizing fiber. The core light travels through the larger core PCF fiber 201 and then out of a tapered end cap with a reflector assembly 202 (e.g., a reversing prism assembly). The reflector assembly 202 includes a first taper, a reflector (e.g., a reversing prism), and a second taper as previously described in FIG. 1. The laser pump light is pumped in a counter propagating fashion by a laser diode pump with drivers and control 204. Examples of mode adapters for matching two types of fibers can be found in U.S. patent application Ser. No. 15/192,389, which is hereby incorporated by reference in its entirety.

Figure 3:
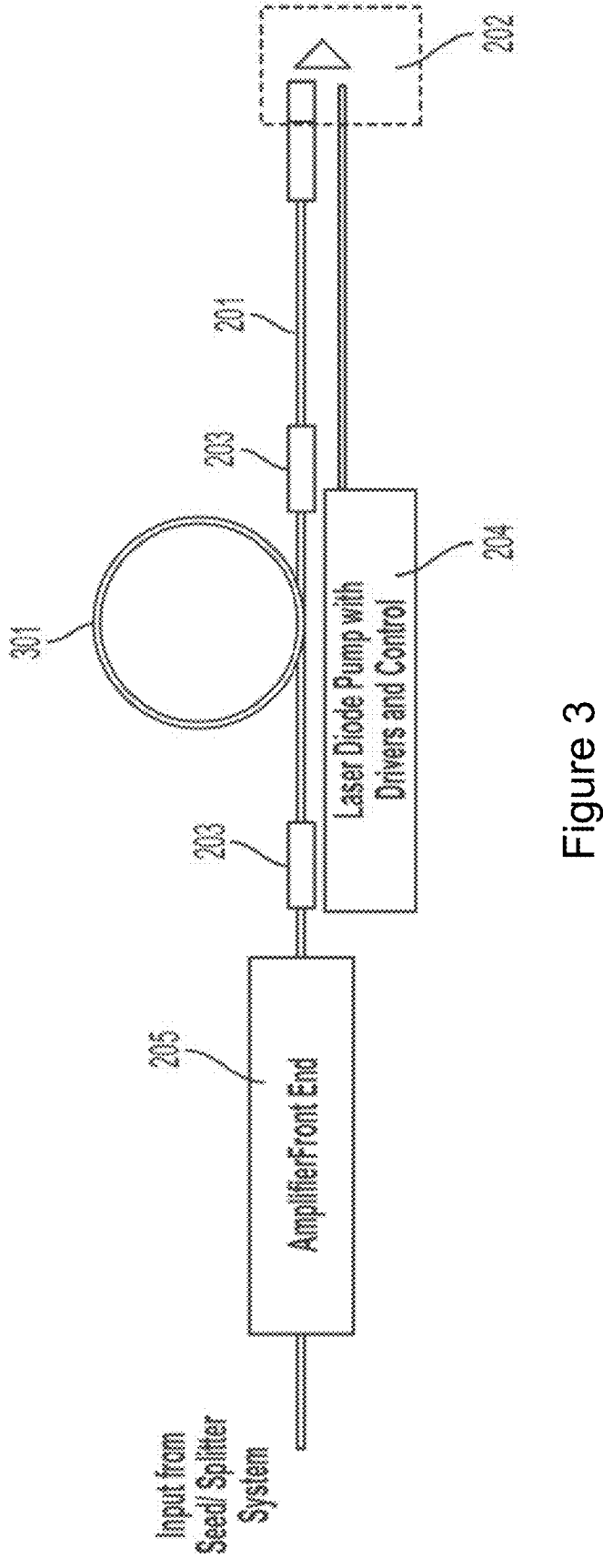
FIG. 3 illustrates another amplifier incorporating counter pumping according to an embodiment of the disclosure.

PCF-type fibers are generally a factor of 5 to 10 times higher in cost than normal large mode area gain fibers. In order to reduce the cost of building the amplifier of FIG. 2, a composite-type fiber like the one shown in FIG. 3 can be created. In FIG. 3, the length of PCF fiber 201 is reduced considerably, e.g., from 1.5 m to around 30 cm. An LMA fiber 301, e.g., a 20 μm core 125 μm double clad Yb-doped fiber, acts as a pre amplifier to the shortened PCF fiber 201.

Figure 4A:
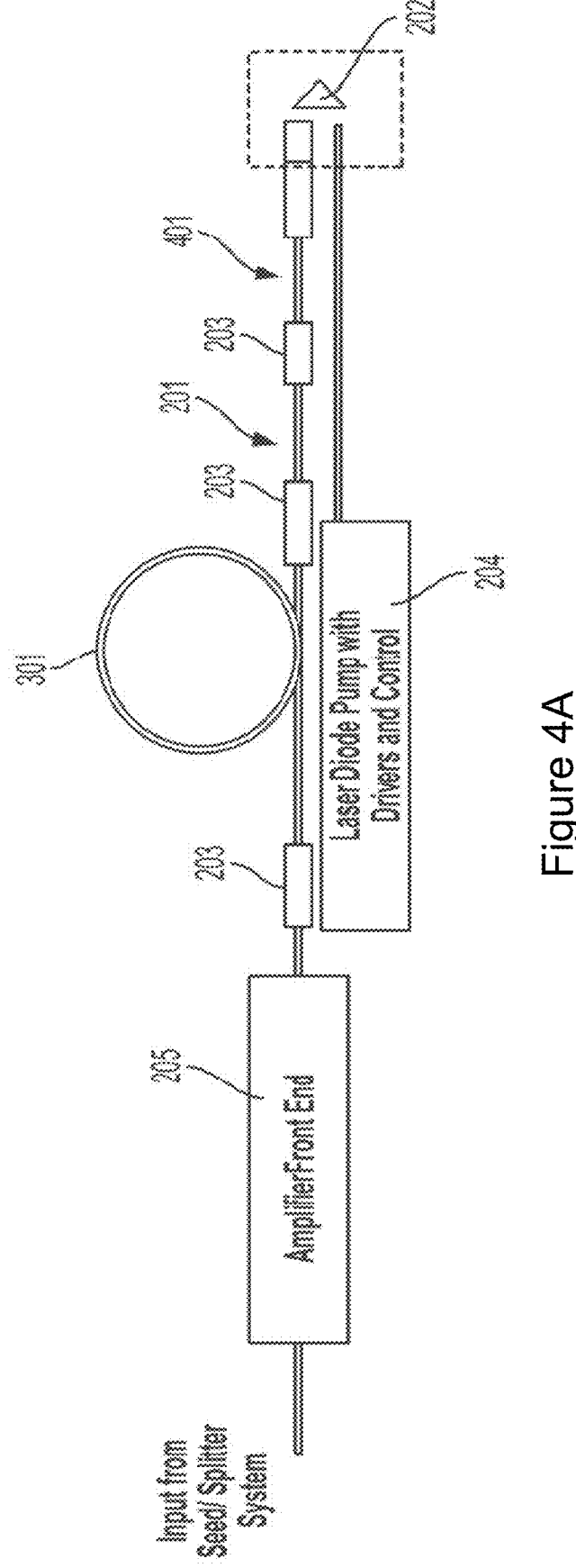
FIG. 4A illustrates yet another amplifier incorporating counter pumping according to an embodiment of the disclosure.

The more costly PCF fiber 201 can be further shortened by adding a third fiber as shown in FIG. 4A. Comparing FIG. 4A to FIG. 3, the output end of the amplifier has an even larger core fiber 401. The core fiber 401 is added using double mode adapters 203 to allow counter pumped pump light to first pump the largest core fiber 401. The pump light that is unabsorbed then passes through the double mode adapter 203 and pumps the PCF fiber 201. The pump light that is unabsorbed from this stage then pumps the LMA fiber 301.

As the core signal light grows in intensity from the input to the output, the core diameter grows with the signal in a step-wise fashion such that the amount of nonlinearities that the amplifier sees is kept low while the cost of the system is greatly reduced. Although FIG. 4A is described with various fiber types, e.g., PCF fiber and LMA fiber, the fibers identified by 301, 201, and 401 can be replaced by a fiber that is continually tapered and that grows in an adiabatic manner from input to output to achieve the same effect.

Figure 4B:
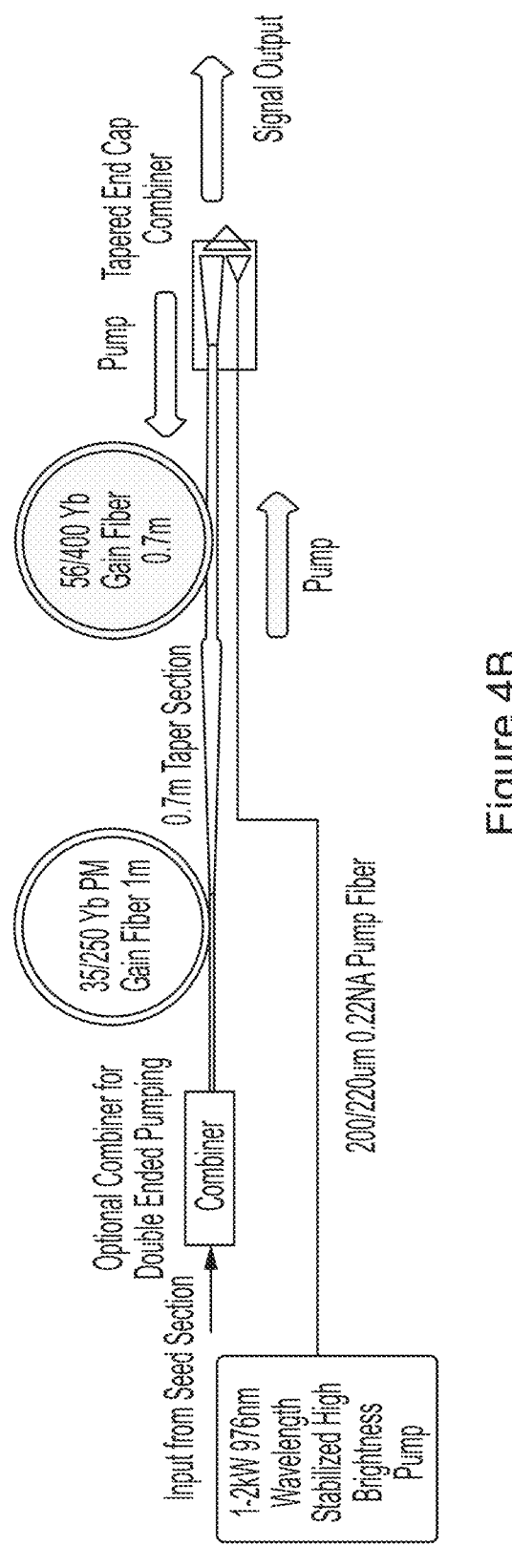
FIG. 4B illustrates yet another amplifier incorporating counter pumping according to an embodiment of the disclosure.

FIG. 4B illustrates yet another amplifier incorporating counter pumping according to an embodiment of the disclosure. The structure shown in FIG. 4B may be able to achieve over 1 mJ in 1 ns at 100 kHz for 1 kW of average optical power at a price of around $4000 per amplifier fiber or less. In this example, an input from a seed section is fed into an optional combiner for double ended pumping. The combiner is connected to a 1 m 35/250 Yb PM gain fiber, followed by a 0.7 m taper section, followed by a 0.7 m 56/400Yb gain fiber. The 0.7 m 56/400 Yb gain fiber is connected to a tapered end cap combiner, which receives counter-pumping light from a 1-2 kW 976 nm wavelength stabilized high brightness pump via a 200/220 μm 0.22 NA pump fiber.

Smaller core fibers are cheaper and have higher gain for a given pump power, but they exhibit higher non-linearities for a given power level. Larger core fibers on the other hand are the opposite. In some embodiments, it is advantageous to begin the amplifier with a smaller core gain fiber and end the amplifier with a larger core gain fiber. Pump power is better utilized when injected at the output end of the amplifier (counter pumped configuration) rather than the input end (co-pumped configuration). Some of the non-linearities, such as self-phase modulation, are governed by the B integral, which is the intensity of the light times the non-linear index of refraction with this product integrated over the length of the fiber. Since the non-linear coefficient is a constant, intensity is the variable to adjust. Therefore, embodiments of the disclosure have the intensity of the signal output light grow quickly right at the output of the amplifier.

Figure 5:
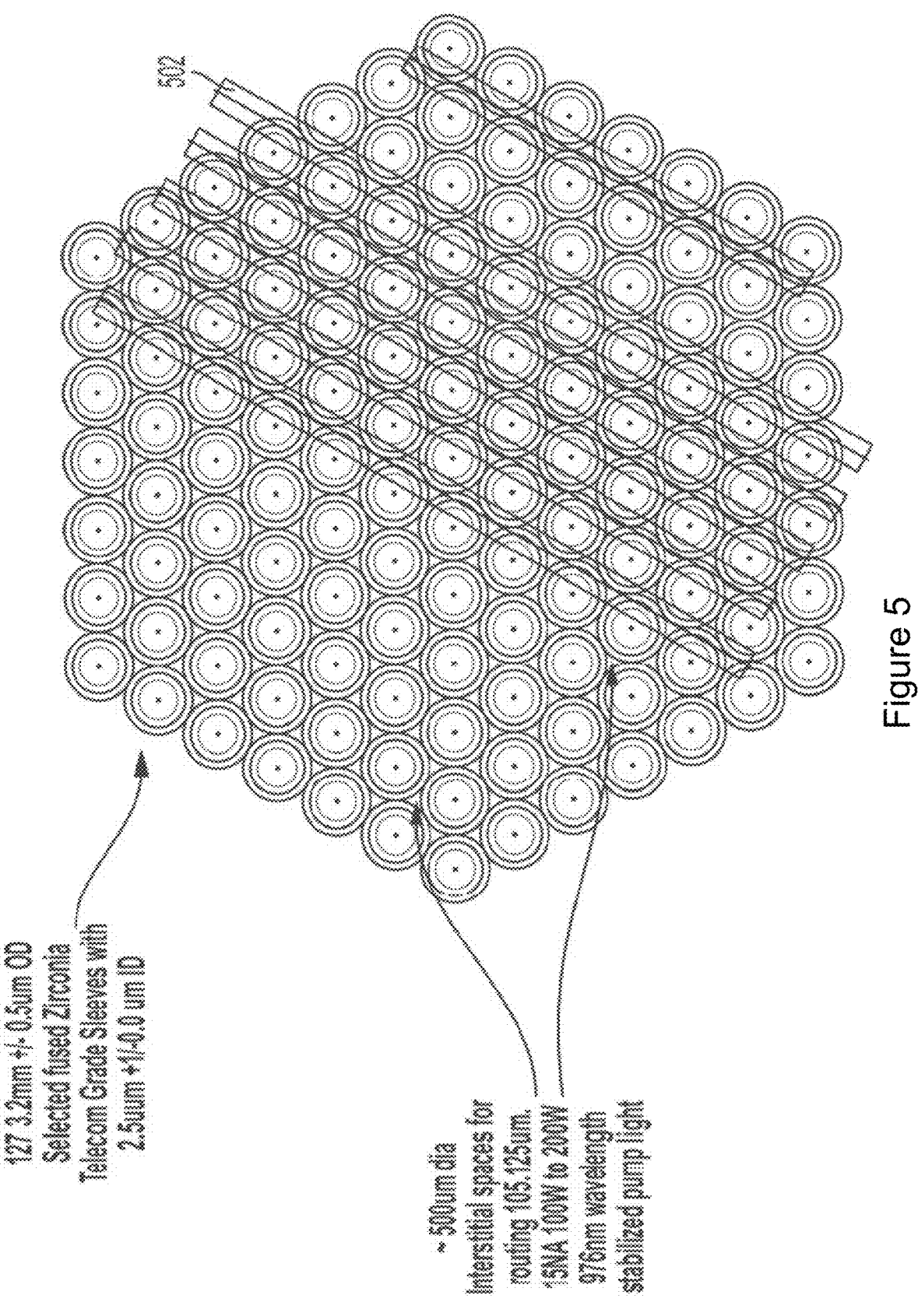
FIG. 5 illustrates an end view of an array of fiber amplifiers according to an embodiment of the disclosure.

Tapered end cap counter pumping according to embodiments of the disclosure are amenable to compact configurations that enable arrangement of precise arrays of fiber amplifiers. FIG. 5 illustrates an end view of such an array of fiber amplifiers according to an embodiment of the disclosure. The circles in FIG. 5 can represent fused Zirconia sleeves, such as those used in the telecom industry. The Zirconia sleeves can be 3.2 mm in outer diameter and 2.5 mm in inner diameter. These sleeves can be produced via a molding and fusing process in very large quantities and can be expensive. High tolerances can be selected for both the outer diameter and inner diameter by selecting sleeves with the proper tolerance. As such, sleeves with an interior diameter tolerance of +/−0.1 μm and an outer diameter tolerance of +/−0.5 μm are readily available. Within the sleeve is provided a fused Zirconia ferrule with a 2.5 mm outer diameter and an interior diameter that matches the signal gain fiber outer diameter, thus providing for a precise placement tolerance of the core of the fiber.

FIG. 5 also illustrates how these precise sleeves can be stacked to obtain a 1-D array, a 2-D square or 2-D hexagonal array such that the output cores of each fiber amplifier in the array can be aligned to a very high precision.

Due to the precise alignment of the shown hexagonal array depicted in FIG. 5, the pumping configuration of FIG. 1 can be implemented by placing long corner reflectors 502 along the array of fibers to serve as reversing prisms 104. The pump fiber 106 and second taper 105 of FIG. 1 can be positioned precisely by running these fibers into the interstitial spaces in the array, positioning the pump fiber 106 and the second taper 105 precisely relative to the reversing prism 104 and the first taper 102.

Figure 6:
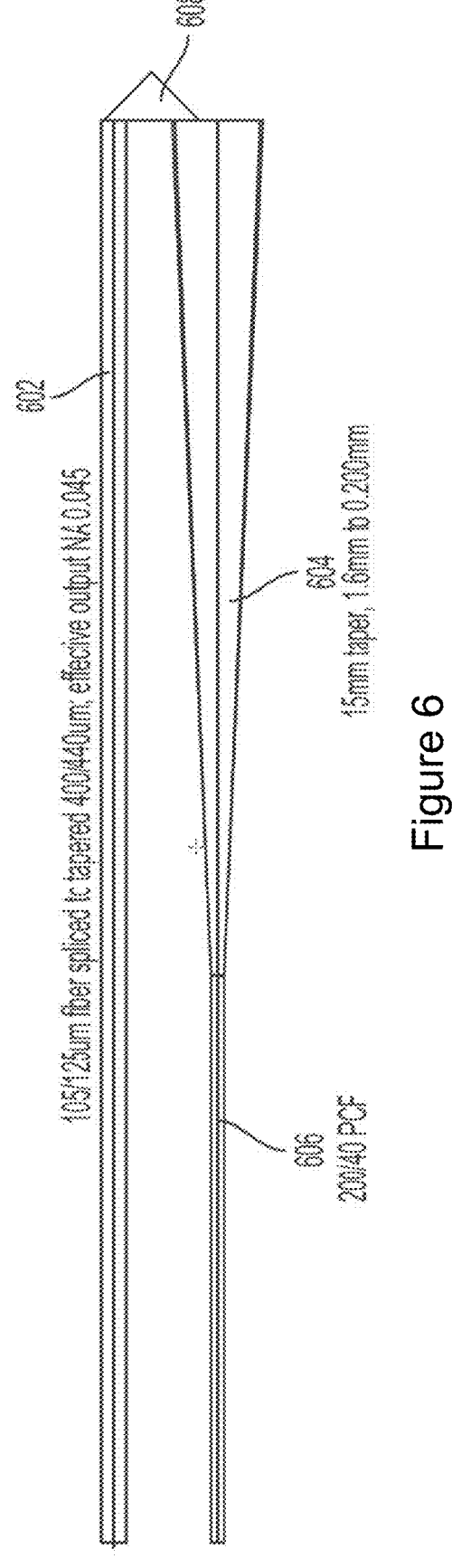
FIG. 6 illustrates a fiber optic assembly for counter pumping according to an embodiment of the disclosure.

FIG. 6 illustrates a fiber optic assembly for counter pumping according to an embodiment of the disclosure. The fiber optic assembly includes a pump fiber spliced unit 602 which includes a 105/125 μm fiber spliced to tapered 400/440 μm which has an effective output NA of 0.045, a reversing prism 608, a 200/40 μm PCF 606 and a 15 mm taper 604 that ranges from 0.200 mm to 1.6 mm. It will be appreciated that in FIGS. 6 and 7A-7B, for ease of depiction, the taper for the pump fiber is not shown, but the pump fiber may nonetheless be tapered as discussed above.

Figure 7A:
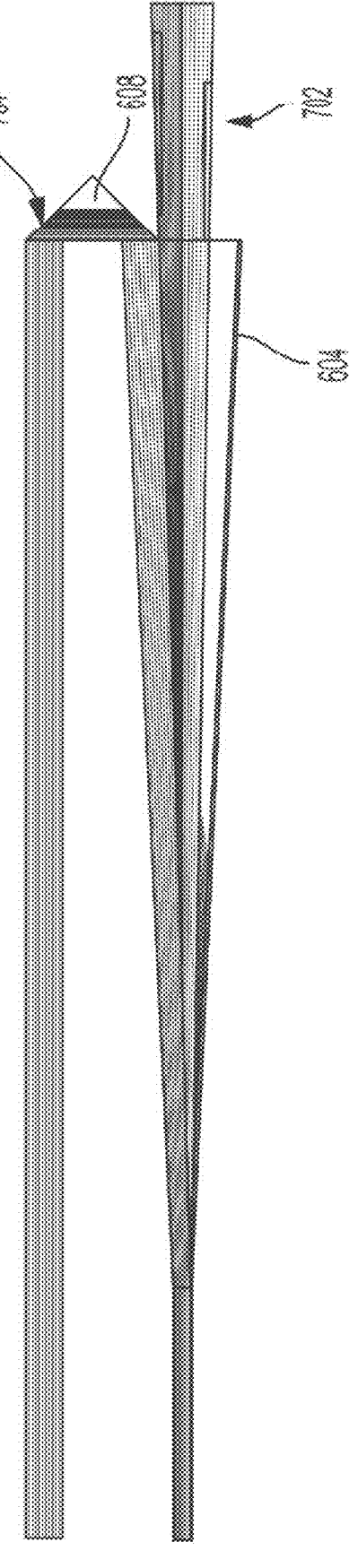
FIG. 7A illustrates beam patterns in the fiber optic assembly of FIG. 6.
Figure 7B:
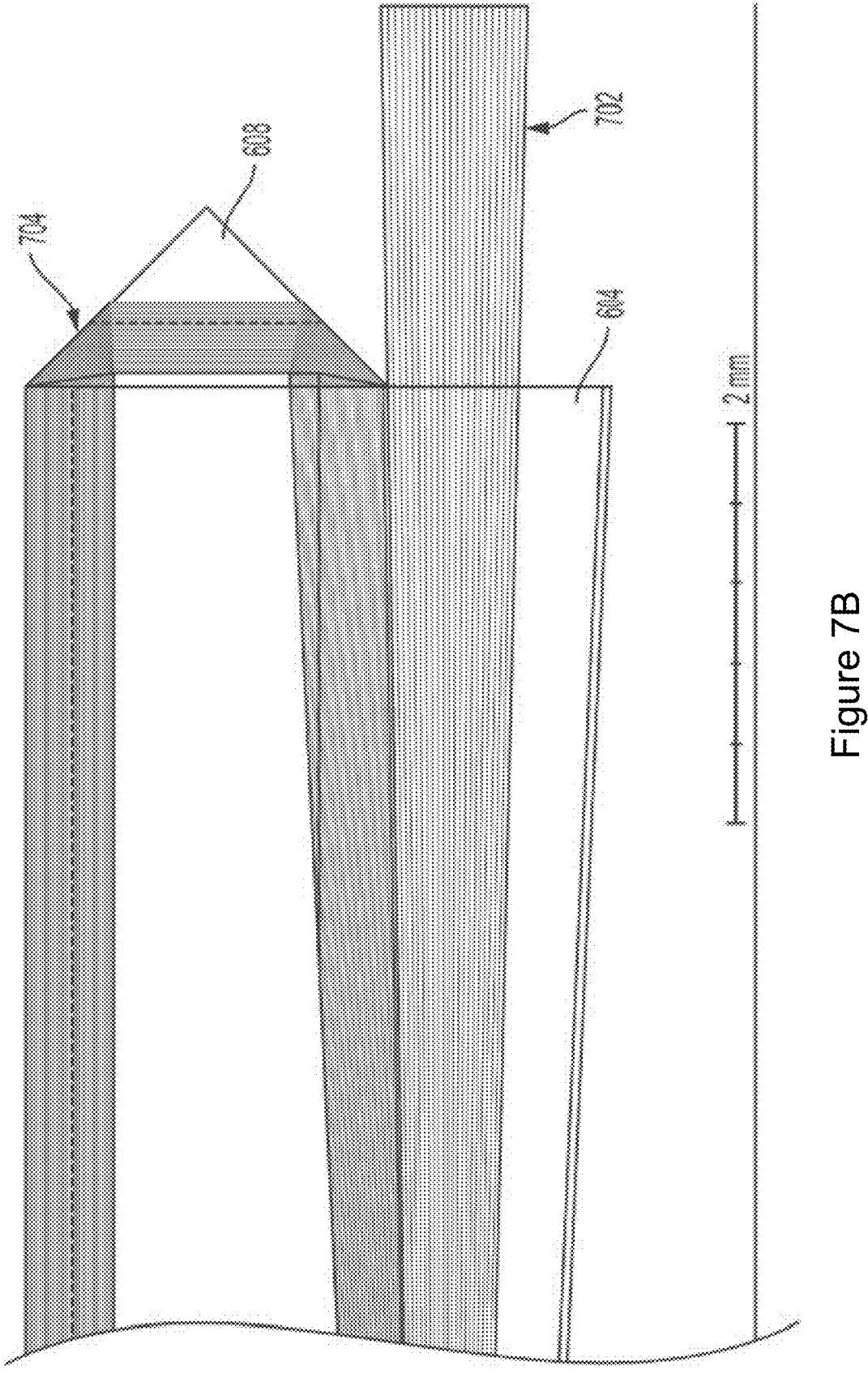
FIG. 7B is a zoomed in view of a portion of FIG. 7A.

FIG. 7A illustrates beam patterns in the fiber optic assembly of FIG. 6. Element 704 corresponds to beams from the pump, and element 702 corresponds to output beams. FIG. 7B is a zoomed in view of a portion of FIG. 7A, showing beams 704 and output beam 702. The beams 704 correspond to pump light from the pump fiber spliced unit 602 which is guided by reversing prism 608 through the taper 604 and to the PCF 606. The output beams 702 corresponds to the signal output from the PCF 606 which expands through the taper 604.

Figure 8A:
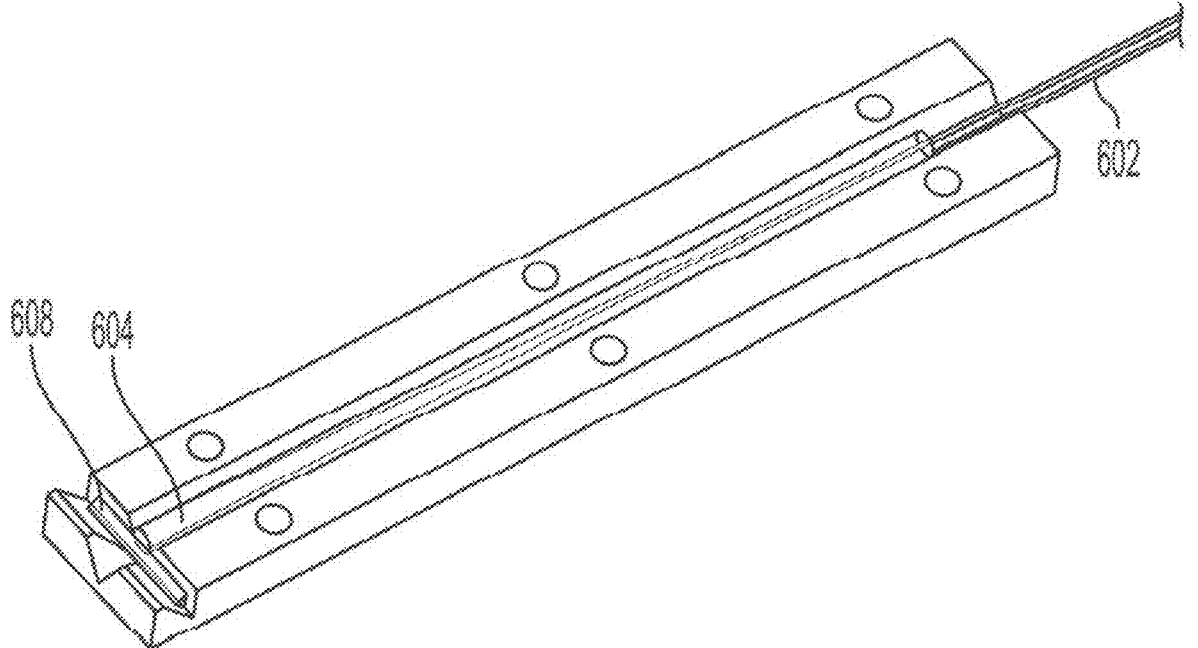
FIG. 8A illustrates a fiber optic assembly for counter pumping according to an embodiment of the disclosure.
Figure 8B:
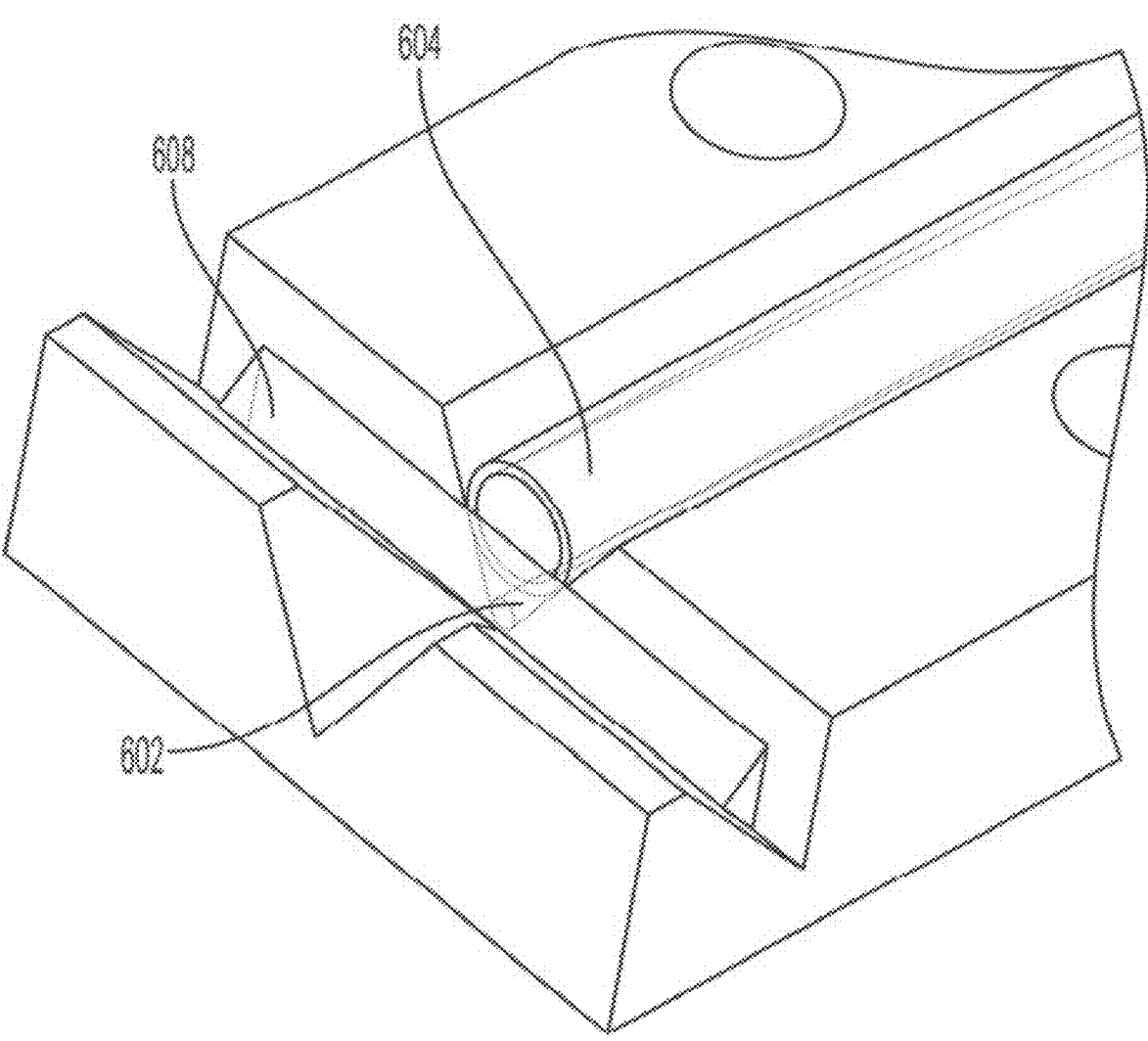
FIG. 8B is a zoomed in view of a portion of FIG. 8A.

FIG. 8A illustrates a fiber optic assembly for counter pumping according to an embodiment of the disclosure. FIG. 8B is a zoomed in view of a portion of FIG. 8A. As can be seen from these figures, a simple and stable support structure can be created with 2 simple "V" grooves holding a very precise optical alignment. In an example, the first "V" groove holds the pump fiber spliced unit 602 on the bottom and the PCF 606 and the taper 604 on top. The second "V" groove holds a reversing prism 608.

Figure 9:
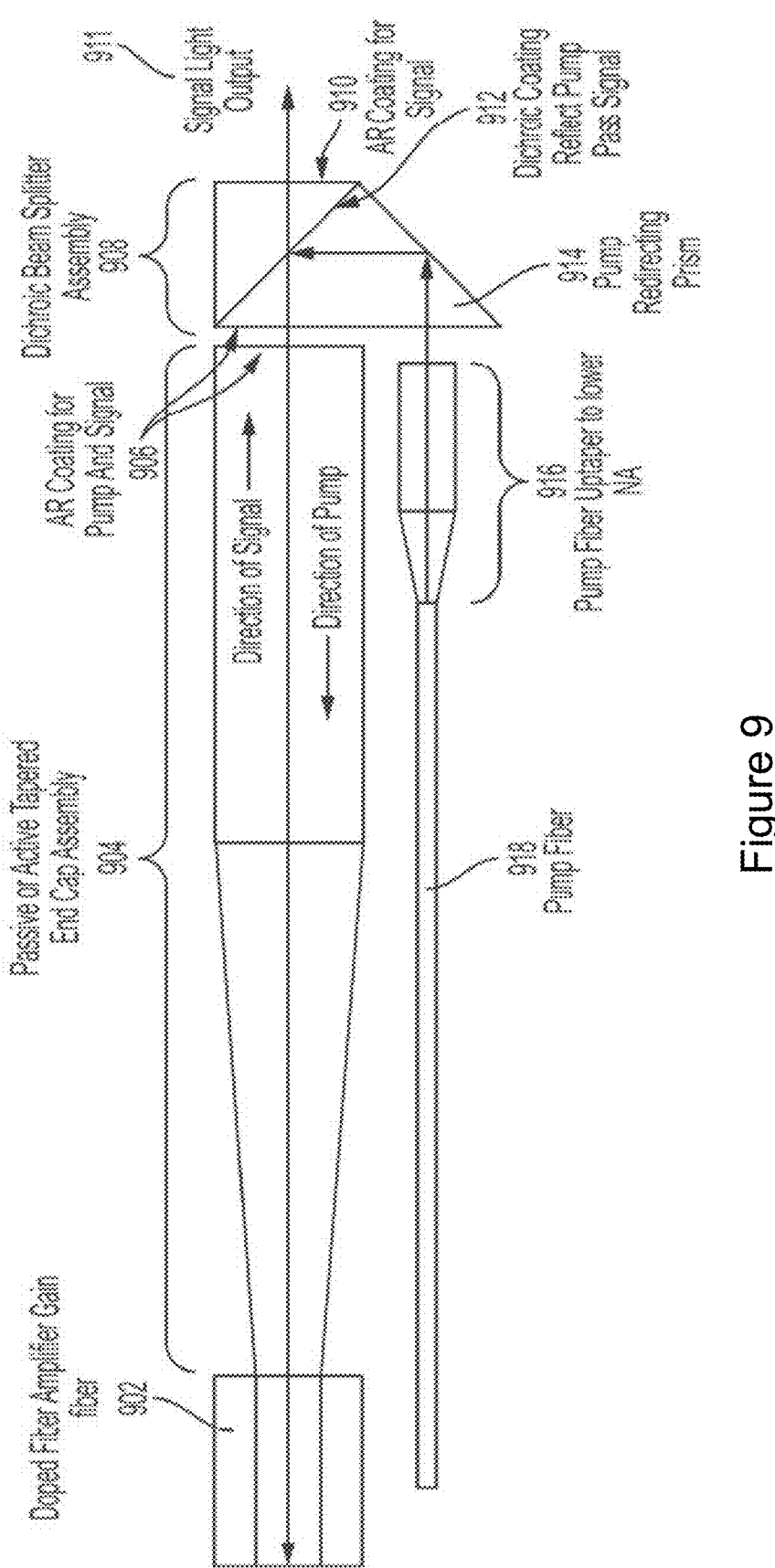
FIG. 9 illustrates a fiber optic assembly for counter pumping according to an embodiment of the disclosure.

FIG. 9 illustrates a fiber optic assembly for counter pumping according to an embodiment of the disclosure. The fiber optic assembly of FIG. 9 includes a doped fiber amplifier gain fiber 902, a tapered end cap assembly 904 which may be passive or active, an antireflective coating 906 for both pump and signal light, a dichroic beam splitter assembly 908, an antireflective coating 910 for signal light, a dichroic coating 912 for reflecting pump light but passing signal light 911, a pump redirecting prism 914, a tapered pump fiber 916, and a pump fiber 918.

In FIG. 1, the pump reversing prism 104 is placed as not to intersect the signal light exiting the first taper 102. This arrangement can be lower loss due to the fewer surfaces the signal will cross, but higher brightness requirements are allocated to the pump assembly. In contrast, FIG. 9 uses a dichroic beam splitting/pump redirecting assembly (the dichroic beam splitter assembly 908) to direct the pump light directly down the fiber axis instead of being offset to the side. The fiber optic assembly in FIG. 9 reduces the brightness requirement for the pump, allowing for higher pump powers to be utilized. In addition, the fiber optic assembly in FIG. 9 allows for the use of an active ion doped tapered end cap assembly as the tapered end cap assembly 904. The active ion doped tapered end cap assembly can provide additional amplifying energy to the overall laser assembly.

Figures 10A, 10B:
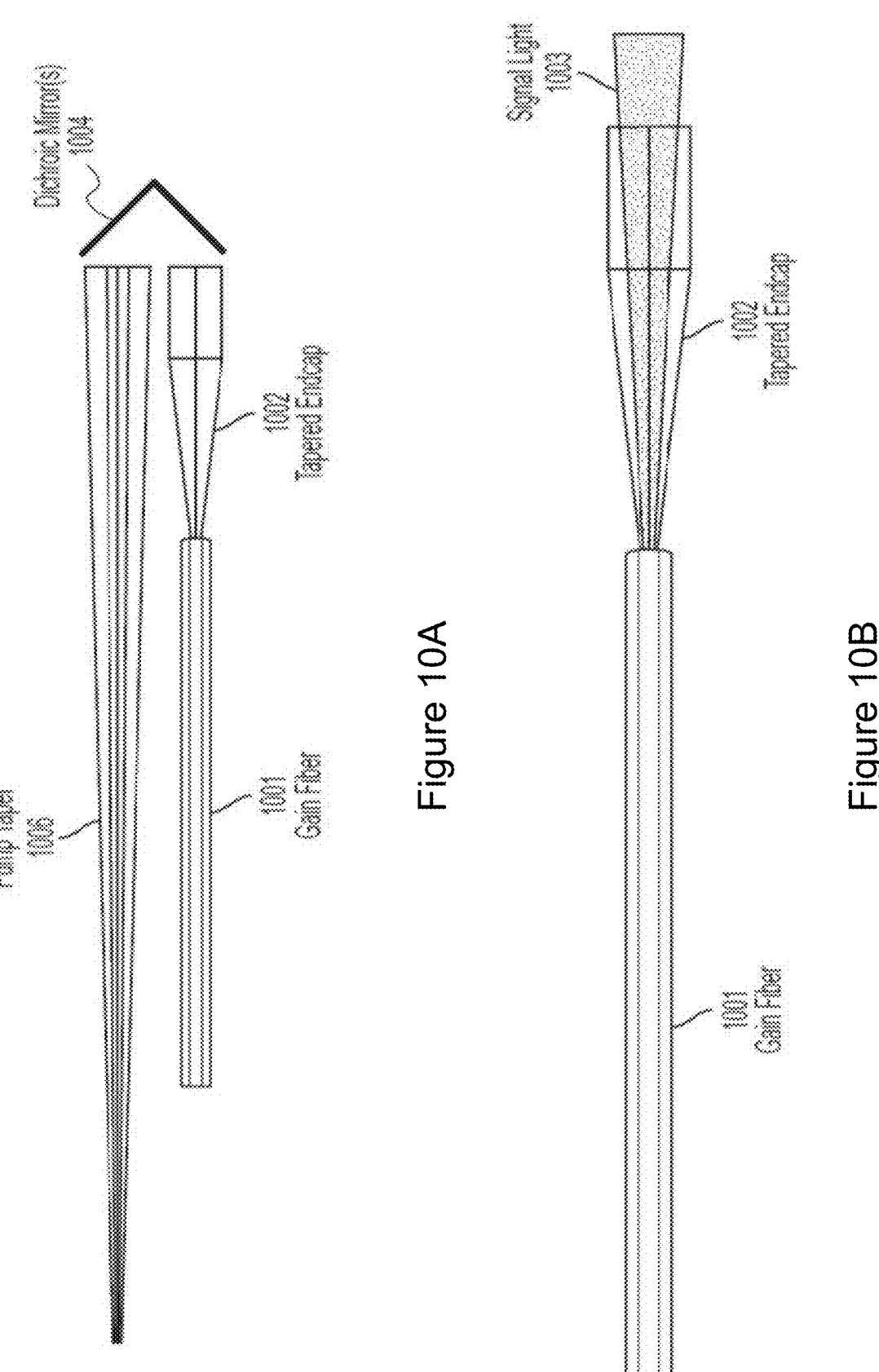
FIGS. 10A-10B illustrate a fiber optic assembly for counter pumping according to an embodiment of the disclosure.

Exemplary embodiments of the disclosure have been tested and demonstrated to achieve high efficiency. In an exemplary implementation as depicted in FIG. 10A, a 105/125 μm 0.15 NA pump fiber was up-tapered to a 400 μm core fiber with a reduction of NA to 0.05. The length of the pump taper 1006 is configured to be long enough to satisfy the adiabatic condition (i.e., such that the expansion of the fiber is gradual enough to avoid light leakage, which may occur if a taper is too short/steep and does not satisfy the adiabatic condition). The pump taper 1006 may be, for example, around 20 mm in length, and the pump taper 1006 does not have a cladding. The gain fiber 1001 may be a PCF fiber having a 200 μm/0.55 NA core, and the tapered endcap 1002 corresponding to gain fiber 1001 may include an up-taper from a 195 μm core to a 1000 μm core, with no clad (the smaller end of the up-taper may be made slightly smaller than the diameter of the PCF fiber to provide some tolerance for alignment purposes). The length of the taper in the tapered end cap is configured to be long enough to satisfy the adiabatic condition but not too long (being too long would cause clipping of the signal beam)—for example, 15 mm in this exemplary implementation. A mirror, such as a dichroic mirror 1004 at 1000 nm having two angled surfaces (e.g., at a 90 degree angle relative to each other) reflects counter-pumped light which exits the pump taper 1006 back towards the gain fiber 1001.

The configuration of the tapers provided an acceptance NA which produces very high efficiency. For example, when tested at low power (input 1 W at 0.15 NA to pump taper 1006), the output counter-pumped light of the pump taper 1006 was also 1 W at 0.05 NA (100% efficiency), and the counter-pumped light output by the tapered endcap 1002 entering the gain fiber 1001 was 0.9996 W at 0.55 NA (~100%). Further, the output of the counter-pumped light as detected at the other end of the gain fiber 1001 (after traversing the gain fiber 1001) was 0.9968 W at 0.55 NA (~100%).

In another exemplary implementation, where the arrangement shown in FIG. 10A was fabricated and tested at 257 mW, the efficiency corresponding to the counter-pumped light at the output of the tapered endcap 1002 was ~96%, with further optimizations with respect to coupling, AR coatings on the fiber, and positioning being implementable to further increase the efficiency.

It will be appreciated that certain exemplary embodiments of this disclosure depict the use of a reversing prism or a dichroic beam splitter assembly as a reflector, and that other types of reflectors, such as dichroic mirror(s), may be used to achieve a similar result. The dichroic mirror(s) 1004 may be implemented, for example, as a single bent dichroic mirror 1004 (e.g., having a 90 degree bend), or as two dichroic mirrors 1004 joined together. The dichroic mirror(s) 1004 may have a dichroic coating on the inner surfaces for reflecting counter-pumped light and allowing signal light to pass through, and an AR coating on an outer surface for avoiding signal light reflection.

FIG. 10B illustrates signal light 1003 exiting the gain fiber 1001 and expanding as it propagates through the tapered endcap 1002. Due to adiabatic expansion of the signal light 1003 in the tapered endcap 1002, there may be deleterious effects on the output signal beam. Thus, at the end of the tapered endcap 1002, a flat surface may be used to minimize back reflections.

Figure 11:
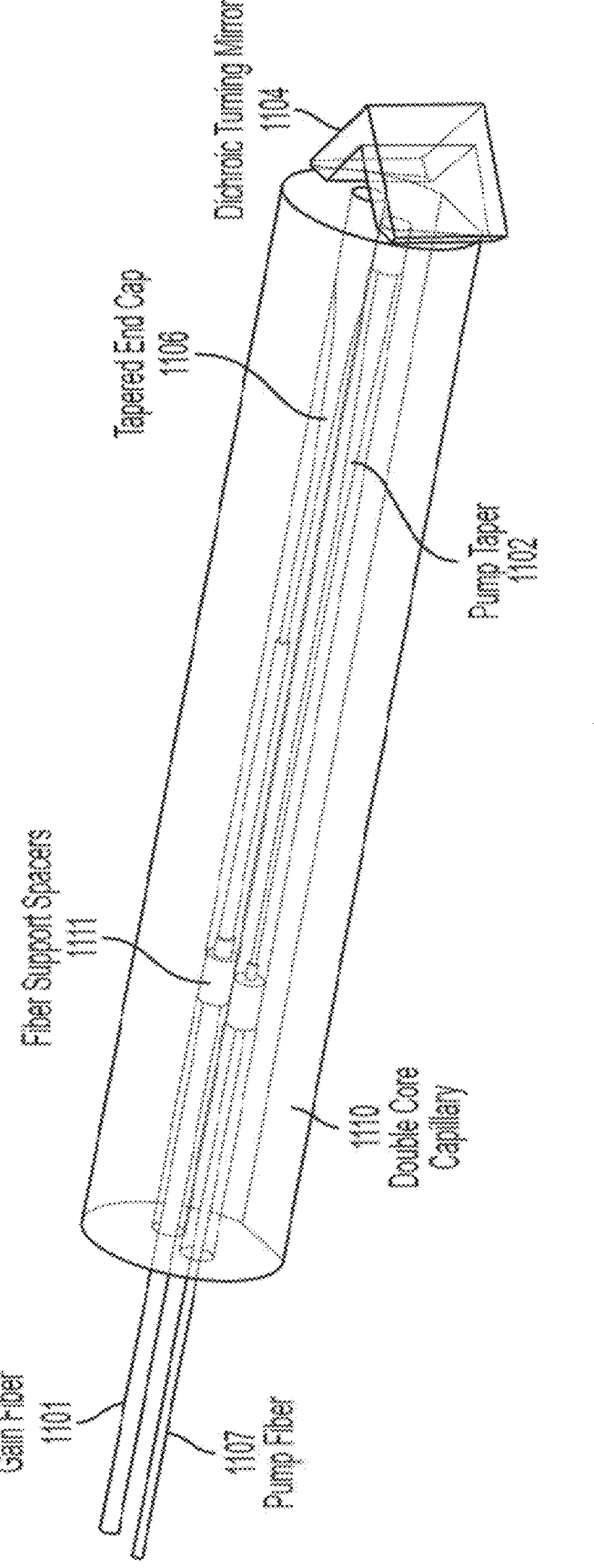
FIG. 11 illustrates a fiber optic assembly for counter pumping with a double core capillary and fiber support spacers according to an embodiment of the disclosure.

FIG. 11 illustrates an exemplary practical implementation in which the tapers were constructed and spliced to PCF1 gain fibers, and with the fiber optic assembly mounted in a glass capillary. In this exemplary embodiment, gain fiber 1101 and pump fiber 1107 are inserted into respective channels of a glass capillary tube (double core capillary 1110) through respective openings in a first surface of the glass capillary tube. The core diameters for the two "cores" (or "channels") of the may be, for example, 1 mm in diameter. Fiber support spacers 1111 (which may, for example, may be made of glass and contain smaller capillaries through which the fibers are inserted) are used to hold each of the fibers in place, and to achieve a precise alignment relative to each other and relative to a dichroic turning mirror 1104 (which may, for example, be a right angle mirror). Signal light from the gain fiber 1101 (which, for example, may have a wavelength of 1 μm) propagates through tapered end cap 1106 and is passed through dichroic turning mirror 1104. Counter-pumped light from pump fiber 1107 (which may, for example, have a wavelength of 976 nm) propagates through pump taper 1102 and is reflected into tapered end cap 1106 by dichroic turning mirror 1104.

It will be appreciated that although the embodiments disclosed above depict an advantageously compact double-backed configuration (in which the gain fiber and pump fibers are approximately parallel and in which the counter-pumped light is reflected back 180 degrees to enter the gain fiber in a reverse direction relative to its previous direction of propagation), exemplary embodiments of the present disclosure also include other arrangements of such fiber optic assemblies. For example, in FIG. 12, gain fiber 1201 and pump fiber 1207 are arranged in a perpendicular arrangement. It will be appreciated that other arrangements and other relative angles between the gain fiber 1201 and pump fiber 1207 may also be used.

Figure 12:
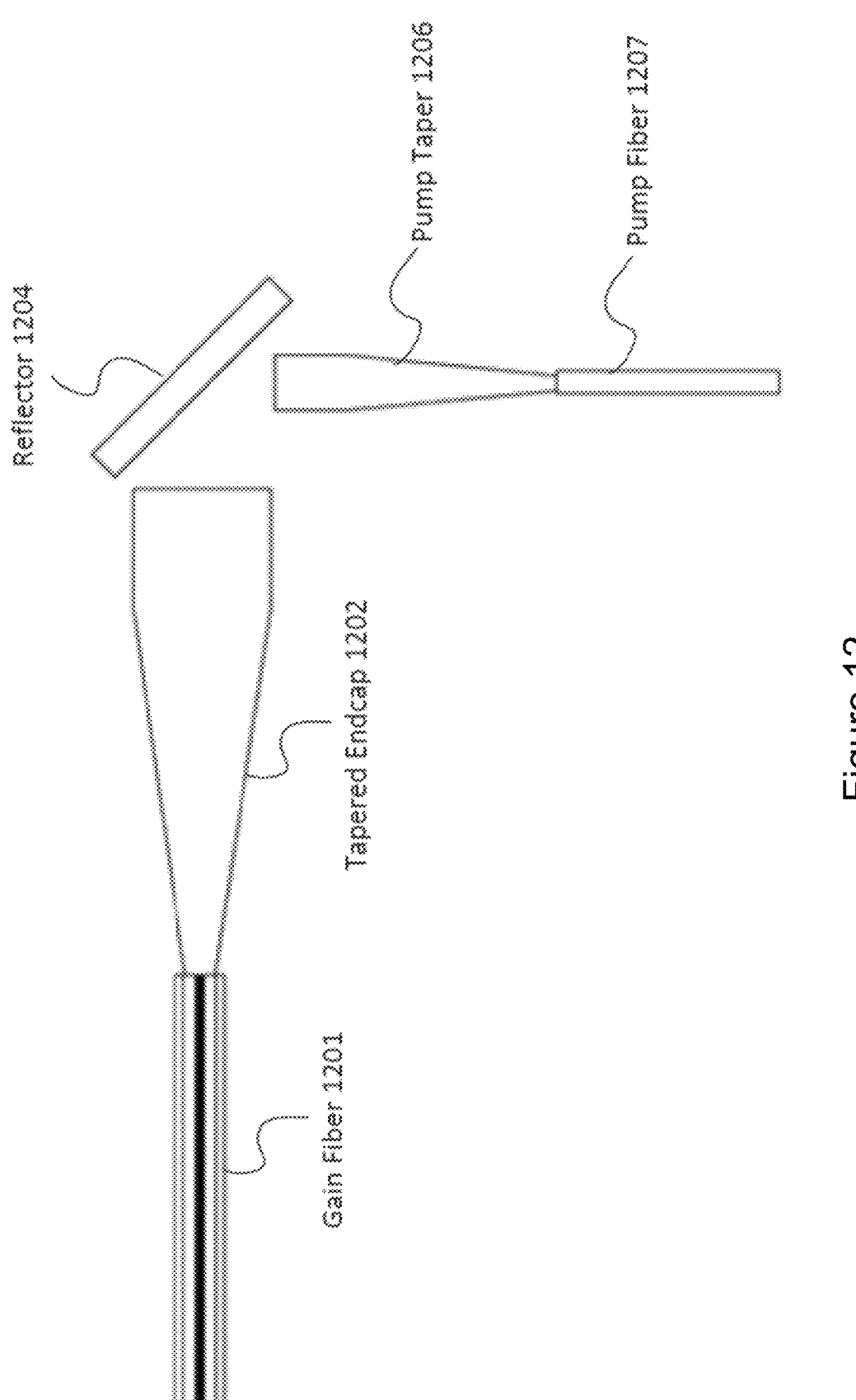
FIG. 12 illustrates a fiber optic assembly for counter pumping according to an embodiment of the disclosure.

In an exemplary implementation of the exemplary embodiment depicted in FIG. 12, the gain fiber 1201 is a 40/200 PCF fiber or an 85/250 PCF rod, with a 0.03 core NA and a 0.055 clad NA. The tapered endcap 1202 has a maximum diameter of 800 μm, and is approximately 25 mm long and has a 0.14 NA. The reflector 1204 is a 1030 nm pass/976 nm reflect dichroic mirror. The pump fiber 1207 is a 105/125 μm 0.15 NA pump fiber that provides over 200 W. The pump taper 1206 is a 400/440 μm up-taper with a 0.05 NA.

It will be appreciated that fiber tapering is utilized to increase or decrease pump fiber diameter to adjust the "jump" from the pump fiber to the amplifier over a distance of less than 5 mm. For example, a high brightness 105/125 μm 0.15 NA pump fiber may be up tapered to a 400/440 μm fiber with a resulting NA reduction of under 0.05 NA. This low divergence pump beam "jumps" a <5 mm gap to a taper that goes from approximately 1 mm to a 200 to 250 μm core diameter of an amplifier gain fiber. On the signal side, the amplified output signal grows adiabatically unguided to the output. Further, a dichroic mirror may be used to separate the two beams.

It will be appreciated that "tapered endcap" and "pump taper" as referred to in various embodiments described above are both tapers. The pump taper is spliced to a pump fiber and acts as a collimating lens which expands the counter-pumped light and reduces the NA (without requiring an actual lens). The tapered endcap is spliced to a gain fiber, receives the counter-pumped light reflected by a reflector (e.g., a reversing prism or a dichroic mirror), and acts as a focusing lens which focuses the counter-pumped light and increases the NA (again without requiring an actual lens). The tapered endcap also expands the signal light beam as it propagates through the tapered endcap and thus also acts as a collimating lens for the signal light beam.

Although splicing is typically preferred for attaching the tapered endcap to the gain fiber and attaching the pump taper to the pump fiber, it may be possible in alternative embodiments to simply position the fibers directly adjacent to one another, or to form the taper and the gain fiber monolithically from a single original fiber.

It will also be appreciated that certain of the figures herein depict the tapered endcap and the pump taper as including a constant-diameter portion. In exemplary implementations, due to the way the tapers are formed and cleaved, such constant-diameter portions may be included for ease of manufacture. However, it is not required to include a constant-diameter portion, and certain exemplary embodiments depicted herein omit the constant-diameter portion of the taper element.

In view of the foregoing discussion, it will be appreciated that embodiments of the present disclosure provide fiber optic assemblies for counter-pumping a PCF or other LMA pulsed fiber amplifier using fiber tapers (also referred to as tapered endcaps), which may be useful in pulse-based and ultrafast applications (such as with respect to laser-based radar, scientific material processing, and in certain medical devices). These architectures provide a way to achieve the advantages of free space counter pumping without the drawbacks of having to use lenses, precision mountings, and long distances as is required with free space counter pumping, and without using a combiner for counter pumping which adds extra fiber length. Instead, the architectures disclosed herein utilize fiber tapers and compact mounting distances.

Exemplary advantages achieved by embodiments of the present disclosure include, but are not limited to the following:

Being completely agnostic as to the type of gain fiber dimensions utilized in the amplifier, so new counter pumped combiner transition fibers do not need to be developed and fabricated.

The core signal output of the fiber amplifier expands adiabatically and in an unguided manner, so there are no intermediate guiding sections to affect the efficiency or quality of the signal output beam.

The matching of the pump brightness to the gain fiber brightness allows for pump coupling that is greater than 95% efficient.

The coupled tapers create an architecture that is highly alignment insensitive, allowing for very small and very rugged mountings.

The tapered end cap may be about 15 mm long so as to achieve virtually no contribution to the B integral, which is particularly advantageous for ultrafast systems.

Both the pump input and the laser output may be AR coated, and the length of the tapered endcap will produce very little in the way of backward coupled light.

In certain embodiments of the disclosure discussed above, the performance of a fiber laser system may be affected by how well respective fiber source end caps are aligned to respective lenses, and the alignment is affected by three independent elements of the system: (1) source fiber(s) with end cap(s); (2) a mount for holding the end cap(s); and (3) lens(es) corresponding to the respective source fiber(s) with end cap(s). Ideally, these elements should be aligned with sub-micron accuracy, but the accumulation of dimensional tolerances in each of these can lead to errors that lead to non-collinearity (all of the beams not pointing in the same direction). The sources of these accumulated errors include (but are not limited to):

1. The concentricity error of the core of the fiber to the outer diameter of the fiber. The alignment of the outer dimensions of the end cap with respect to the fiber.

2. The dimensional center to center accuracy of the surfaces along which the fiber/end cap assembly is mounted.

3. In many cases the collimating lenses are from a microlens or lenslet array. A microlens or lenslet array may be used to collimate an entire fiber array with one device. Since the placement of the individual lenses of the microlens or lenslet array are defined by a photolithographic process, the center of each lens is defined to submicron accuracies. However, if the fiber array is not equally accurate, the translational errors which exist in the light path before the microlens or lenslet array will turn in to angular alignment errors after the microlens or lenslet array. In other words, due to the typical short focal lengths of these lenslet array elements, positional errors in #1 and #2 translate to large angle errors on the output. As a result, even small errors on the order of a micron or two can translate to large reductions in the combined power of the laser array.

In further exemplary embodiments of the present disclosure, a simpler and more accurate way of aligning the outputs of a fiber laser array is provided based on using a glass capillary, which can be made with high accuracy and is something that is known to be inherently accurate. In particular, the alignment of a fiber laser array system can be improved by individually attaching each fiber/end cap assembly to a respective capillary tube in an aligned manner, which is in turn attached and individually aligned to a respective lens of a microlens or lenslet array, such that each respective fiber is individually aligned to a corresponding lens of the microlens or lenslet array. The individual alignment for each end cap+tube+lens combination is performed using a distant camera, and thereby avoids the need to rely on the fiber assembly mount for alignment of the plurality of fiber/end cap assemblies relative to one another to achieve alignment of respective fibers to corresponding lenses.

Further, when combining the outputs from multiple lasers, fiber lengths are to be adjusted very precisely (down to a fraction of a wavelength), and this is conventionally a very expensive process. In embodiments of the present disclosure, the alignment of a respective end cap to a respective tube (wherein the end cap is well-fitted to the tube) includes 1-dimensional alignment for the length of the fiber by electromechanically sliding the end cap and the tube relative to one another (the sliding action can be thought of as being similar to the sliding action of a trombone). Thus, embodiments of the present disclosure are able to efficiently and cost-effectively control the overall fiber length and align the outputs from multiple lasers to one another in terms of length.

Additionally, it will be appreciated that exemplary embodiments of the present disclosure provide various advantages with respect to building relatively high power lasers. In conventional systems, a problem with a single laser is that as it gets bigger (and higher power), it becomes more difficult to deal with thermal and non-linearity issues. Synthesizing one big laser beam out of a plurality of small laser beams helps to overcome these issues, but they raise new issues with respect to how to combine the small laser beams (e.g., with regard to making sure the beams go out parallel to each within a tolerance of, for example, less than 20 uRad, and thus holding the small lasers in place relative to one another very precisely). Exemplary embodiments of the present disclosure provide an inexpensive way to create a sufficiently precisely-aligned array while complying with space constraints. Advantageously, by utilizing counter-pumping for respective individual channels in the counter-pumped tapered end cap (CPTEC) architecture discussed herein, embodiments of the disclosure provide for significant improvements in efficiency and peak power output (e.g., 2× or 3 dB improvement) while also complying with the space constraints associated with systems in which small lasers are combined. High average power output is also achieved.

Figure 13A:
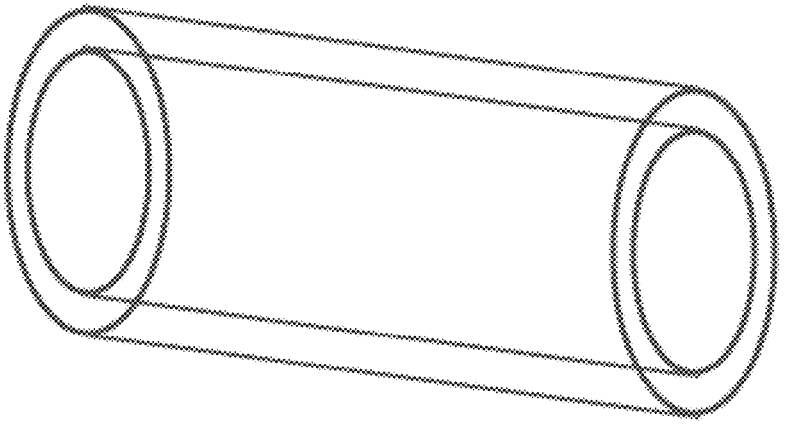
FIG. 13A depicts an example of a glass capillary.

An example of a glass capillary (also referred to as a glass tube) is shown in FIG. 13A. A glass capillary is drawn from a larger glass preform in a standard horizontal or vertical fiber draw facility. Since the drawing process is actively controlled, the outer diameter can be controlled to the micron level. Since the draw is happening in a continuous process, the variation over the length of the tube (e.g., about 25-50 mm long) is extremely small. Indeed, a glass tube can be drawn up to 1 km in length with accuracy of ~0.1 μm. The tube-to-tube diameter (corresponding to the tolerance on the tube diameter among a collection of tubes) can be controlled to less than 3 μm and can be made even less by measuring and binning the tubes. Since the glass tubes are very inexpensive, using glass tubes provides for high accuracy at very low cost. In a well-designed and accurately-fabricated v groove structure, the glass tubes can be stacked in a hexagonal or square structure very tightly and very accurately.

Figure 13B:
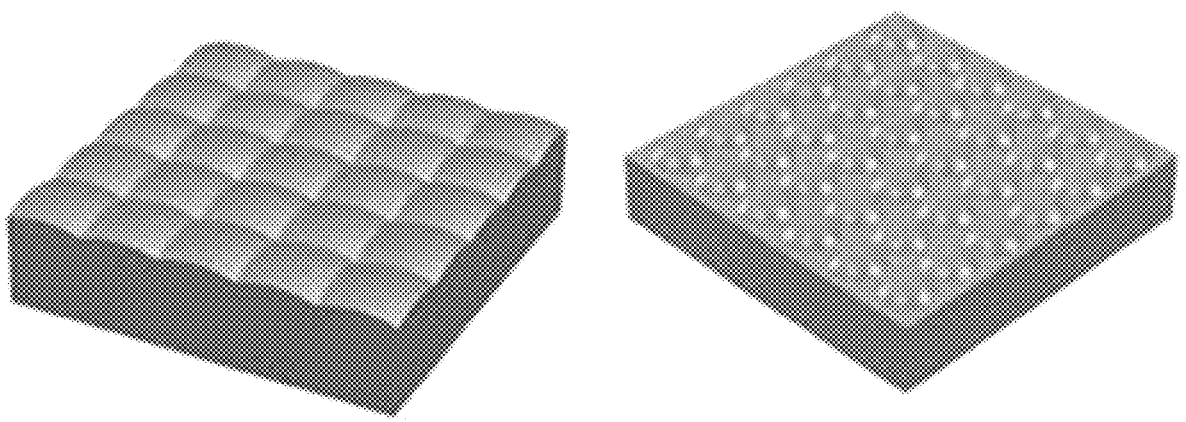
FIG. 13B depicts examples of a microlens or lenslet array.

The fiber x-y placement (perpendicular to the output plane of the fiber array) has high tolerance. One factor that drives the high tolerance of the fiber x-y placement is the fact that the fiber array is collimated by way of a glass microlens or lenslet array. Such an array is shown in FIG. 13B. As mentioned above, the microlens or lenslet array may be used to collimate an entire fiber array with one device. Since the placement of the individual lenses of the microlens or lenslet array are defined by a photolithographic process, the center of each lens is defined to submicron accuracies.

In an exemplary implementation, a 5 mm thin-walled glass capillary which is drawn, post-processed, and selected to <5 μm diameter tolerance with <1 μm runout may be used.

Figure 14A:
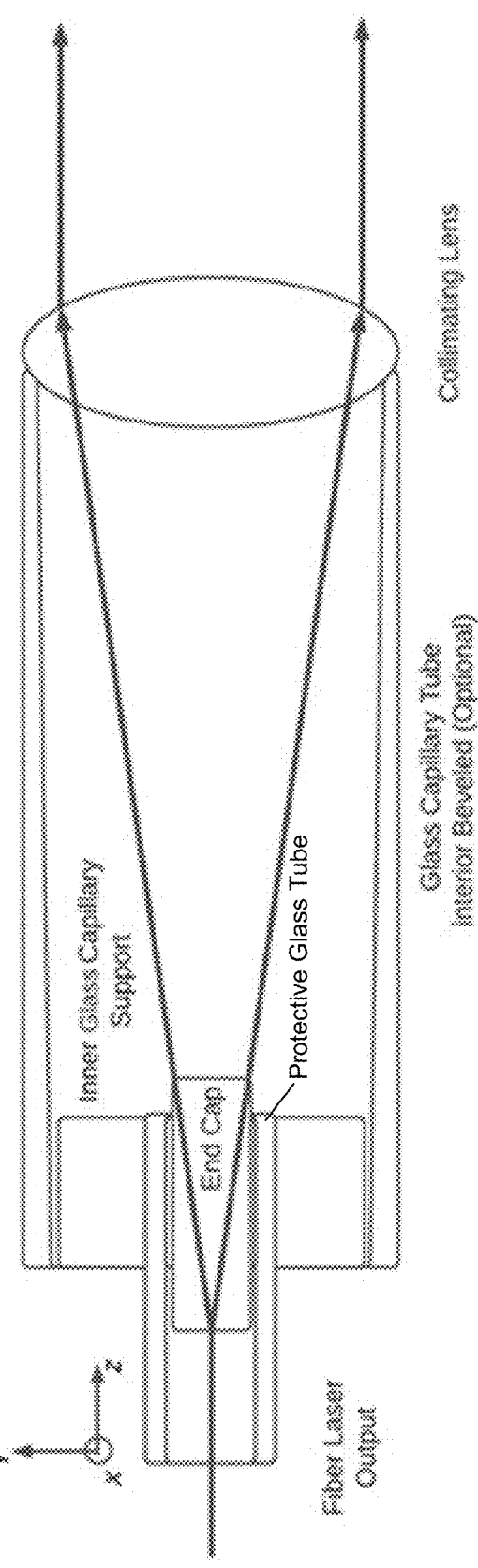
FIG. 14A depicts a single channel fiber support with a collimating lens in an exemplary embodiment.

FIG. 14A depicts a single channel fiber support with a collimating lens in an exemplary embodiment. A highly accurate glass (typically a pure form of fused silica with low absorption) tube has the collimating lens (which is an individual lens out of a plurality of lenses of a microlens or lenslet array) fused to the outer diameter edge of the tube. Standard procedures can be used to ensure that the center of the lens' focal point is aligned to the central axis of the tube (e.g., using a point source microscope). The end capped fiber is inserted into a protective glass tube, with the protective glass tube being inserted into an inner glass capillary support. The inner glass capillary support is a short tube whose outer diameter (OD) is slightly less than the inner diameter (ID) of the outer glass capillary tube and whose ID is slightly larger than the OD of the protective glass tube around the end cap. In an exemplary embodiment, the OD of the outer glass capillary tube is 4.5 mm in diameter (this sets the pitch of the array when stacked). The ID is about 0.5 mm in diameter less so that the collimated light does not clip the outside of the outer glass capillary tube. Optionally, as shown in FIG. 7, the outer glass capillary tube has a beveled interior for the same effect (i.e., to avoid clipping). The inner glass capillary support is shown to bridge the distance between the outer glass capillary tube and the protective glass tube around the end cap. The end cap is typically around 2.5 mm in diameter and 15 mm long, and the fiber diameter with buffer is about 600 μm. It will be appreciated that three nested glass tubes are shown in FIG. 14A—i.e., the outer glass capillary tube, the inner glass capillary support, and the protective glass tube.

Figure 14B:
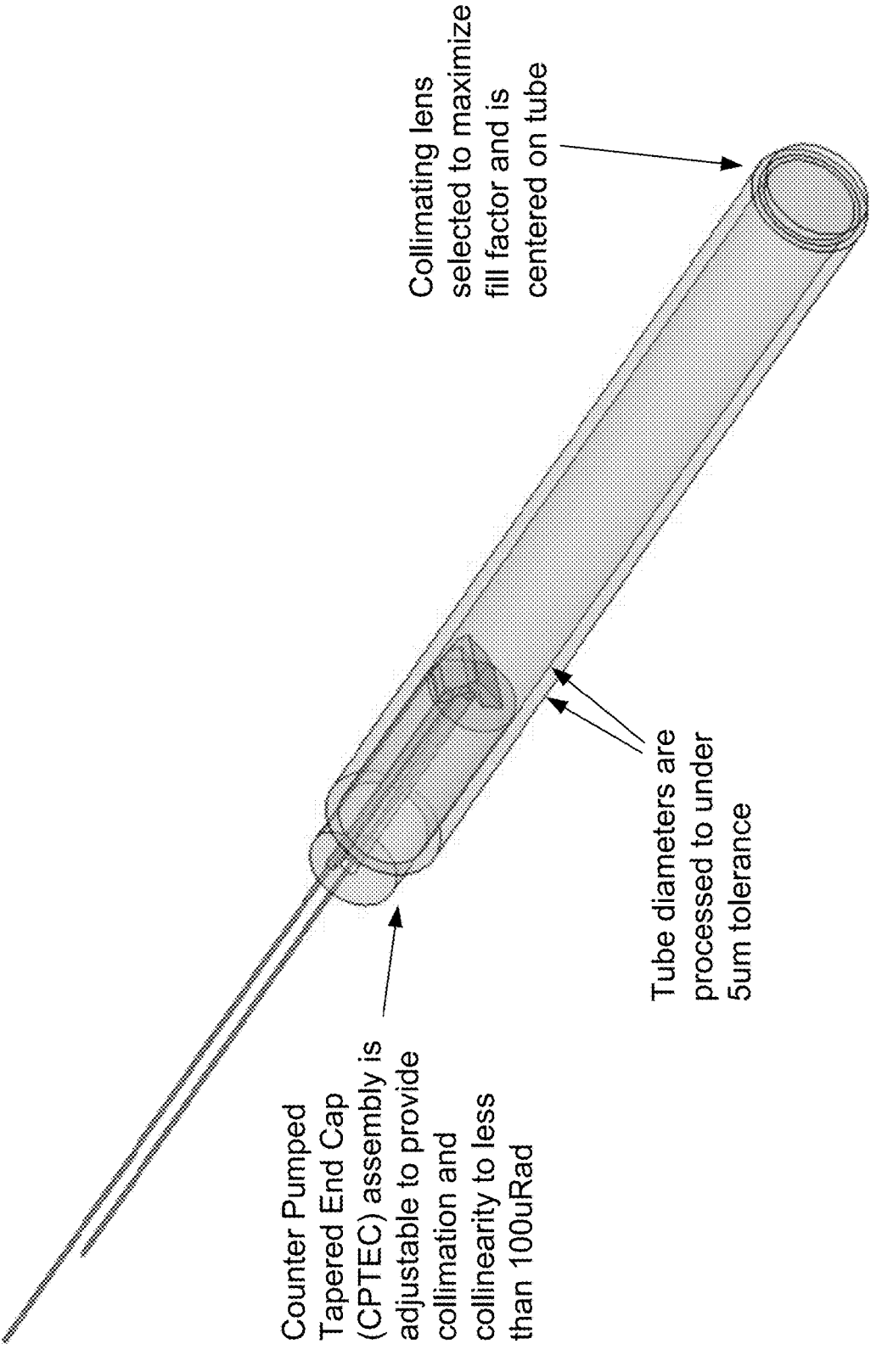
FIGS. 14B-14C are schematic diagrams depicting an exemplary implementation of the single channel fiber support with collimating lens.
Figure 14C:
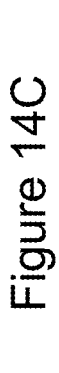

FIGS. 14B-14C are schematic diagrams depicting another exemplary implementation of a single channel fiber support with collimating lens, with detail being shown for the signal fiber with tapered end cap, a counter-pumping fiber with tapered end cap, and a reflector. In various embodiments, the signal fiber, the counter-pumping fiber, and the reflector may be arranged, for example, in accordance with the exemplary embodiments discussed above with respect to FIGS. 1-4B, 6-7B and 9-11. Further, as shown in FIGS. 14B-14C, this combination of components (the signal fiber with tapered end cap, the counter-pumping fiber with tapered end cap, the dual-bore tube in which the two fibers are disposed, and the reflector) may be referred to as a counter-pumped tapered end cap (CPTEC) assembly. The CPTEC assembly is disposed and adjusted/aligned within an outer glass capillary tube (which may have a beveled interior) attached to a collimating lens (which may be a respective collimating lens of a microlens or lenslet array). The overall assembly depicted in FIGS. 14B-14C may be used within various amplifier systems (e.g., as shown in FIGS. 2-4B).

As shown in FIG. 14B, the CPTEC assembly may be adjusted (as will be discussed below in connection with FIG. 17B) relative to the outer glass capillary tube to provide for collimation and collinearity with accuracy of less than 100 μRad. The collimating lens of each assembly may be selected to maximize fill factor and may be centered relative to the outer glass capillary tube. Additionally, as discussed above, the tube diameters may be processed to under 5 μm tolerance.

Further, FIG. 14C provides a side view of the CPTEC assembly depicted in FIG. 14B. In an example, the outer glass capillary tube has a diameter of 0.8 mm and a length of 41.9 mm, and the inner tube has a diameter of 0.6 mm and a length of 20 mm. The overlap between the inner tube and the outer glass capillary tube is 15 mm, such that the inner tube has a non-overlapping portion of 5 mm and the outer glass capillary tube has a non-overlapping portion of 26.9 mm.

Figures 15A, 15B:
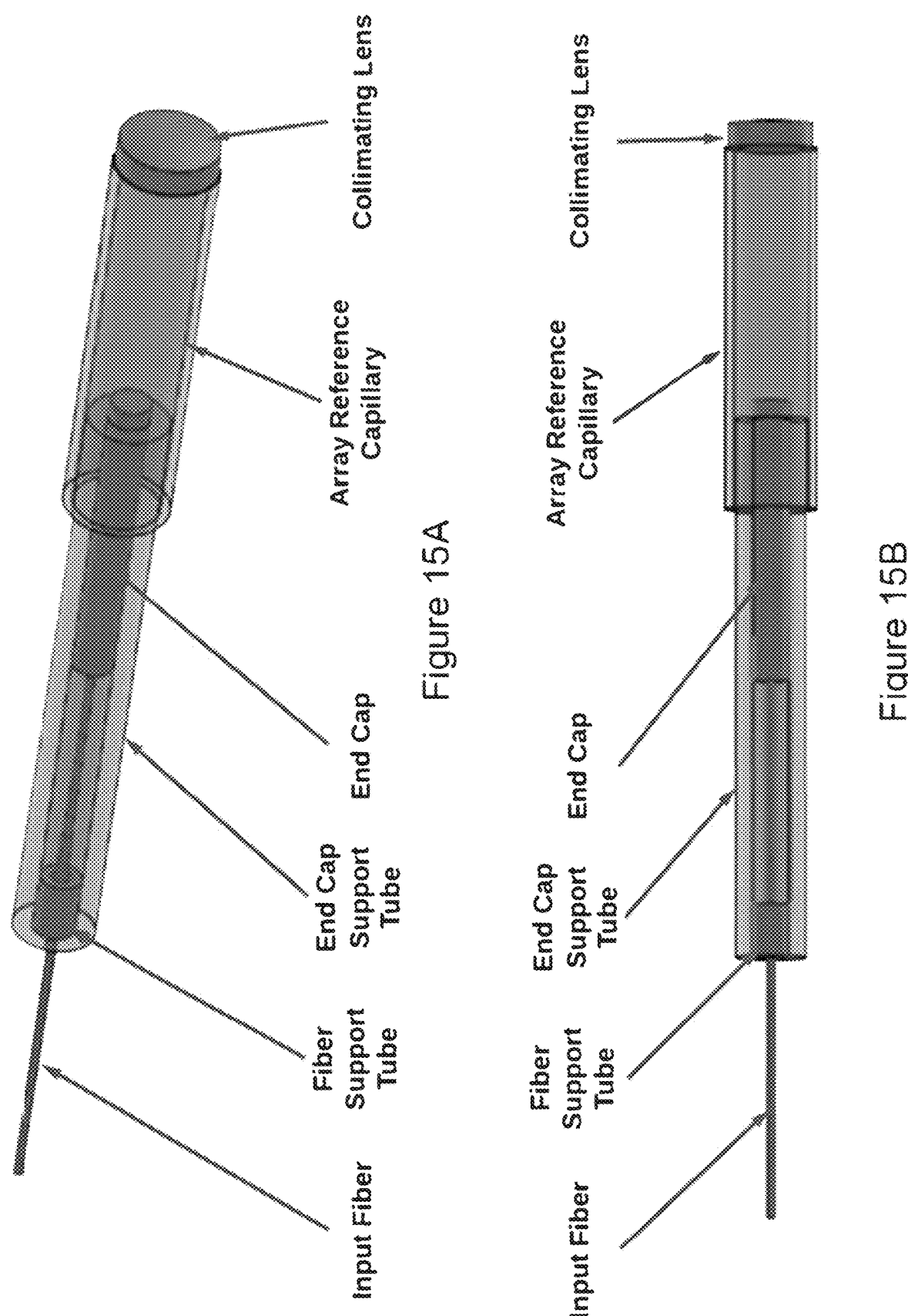
FIGS. 15A-15B are schematic illustrations of a single channel fiber support with a collimating lens in an exemplary embodiment.

FIGS. 15A-15B are schematic illustrations of a single channel fiber support with collimating lens in an exemplary embodiment. As can be seen in FIGS. 15A-15B, similar elements as depicted in FIG. 14A are shown, including an input fiber, a fiber support tube (also referred to herein as a protective glass tube), an end cap support tube (also referred to herein as an inner glass capillary support tube), an end cap, an array reference capillary (also referred to herein as an outer glass capillary tube), and a collimating lens.

To form respective single channel fiber supports with collimated assemblies as shown in FIGS. 14A-14C and 15A-15B, an alignment process is performed to ensure that the direction of the collimated output beam is parallel with high accuracy. Based on accurate alignment, when the collimated glass tube assemblies are stacked together (e.g., in a square or hexagonal assembly), all of the beams will be parallel (or substantially parallel) to each other, thereby providing for accurate coherent beam combining. An acceptable margin of error and associated tolerances for beams not being exactly parallel to one another is described, for example, in Goodno et al., "Perturbative analysis of coherent combining efficiency with mismatched lasers," Optics Express, vol. 18 no. 24, p. 25403 (22 Nov. 2010), which is incorporated herein by reference in its entirety.

Figure 16A:
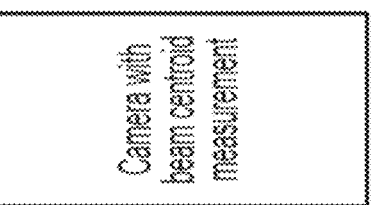
FIG. 16A depicts a block diagram of an alignment station usable for alignment of a single channel fiber support in an exemplary embodiment.
Figure 16A:
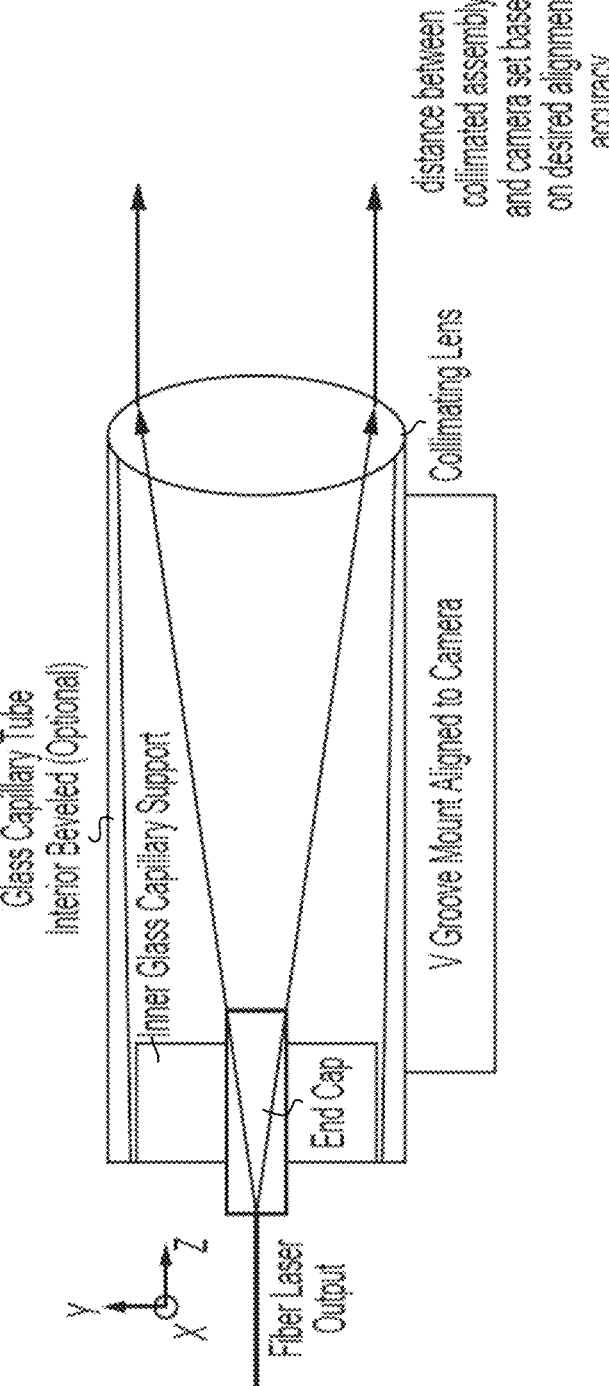
Figure 16B:
Figure 16C:
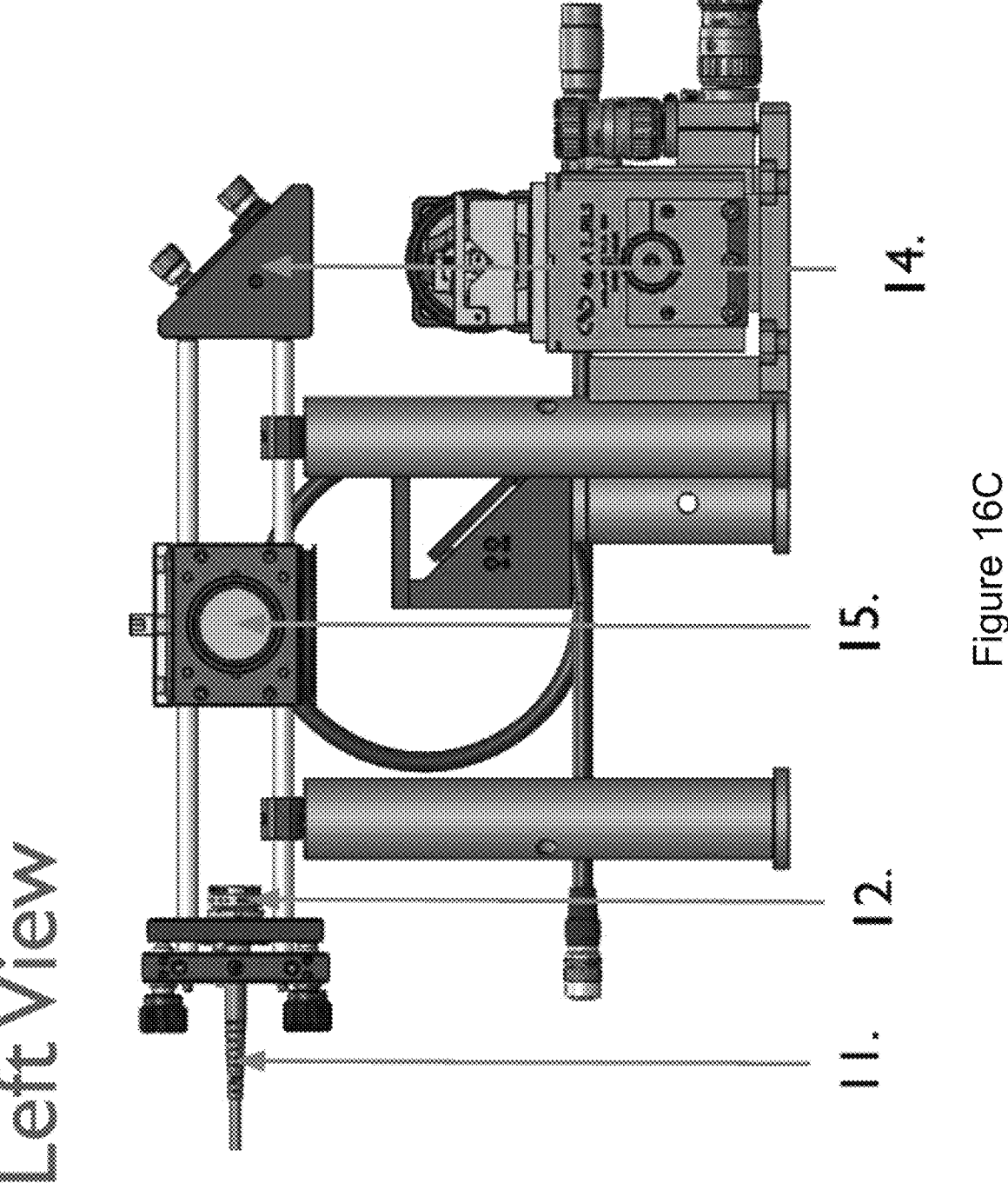
Figure 16D:
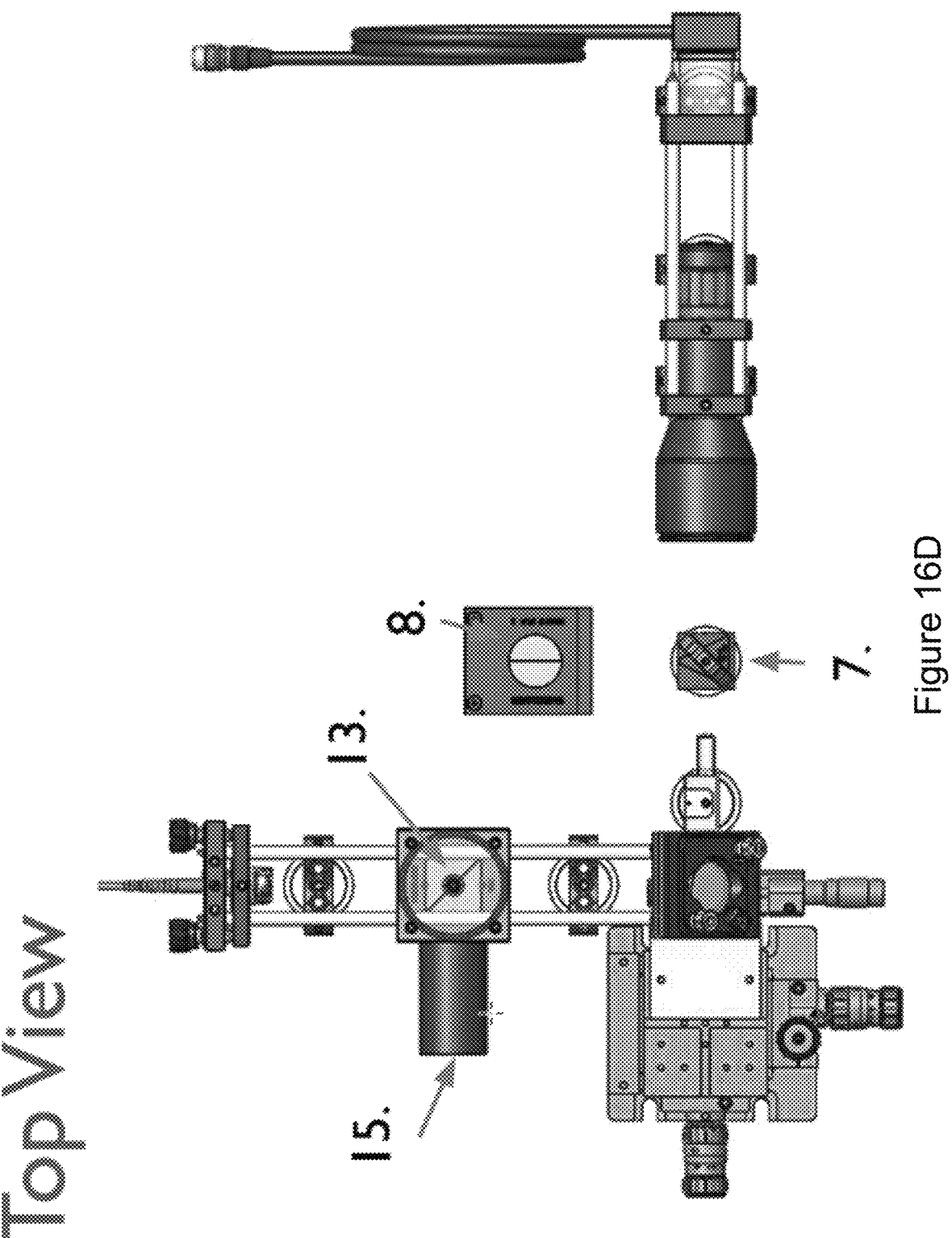
Figure 16E:
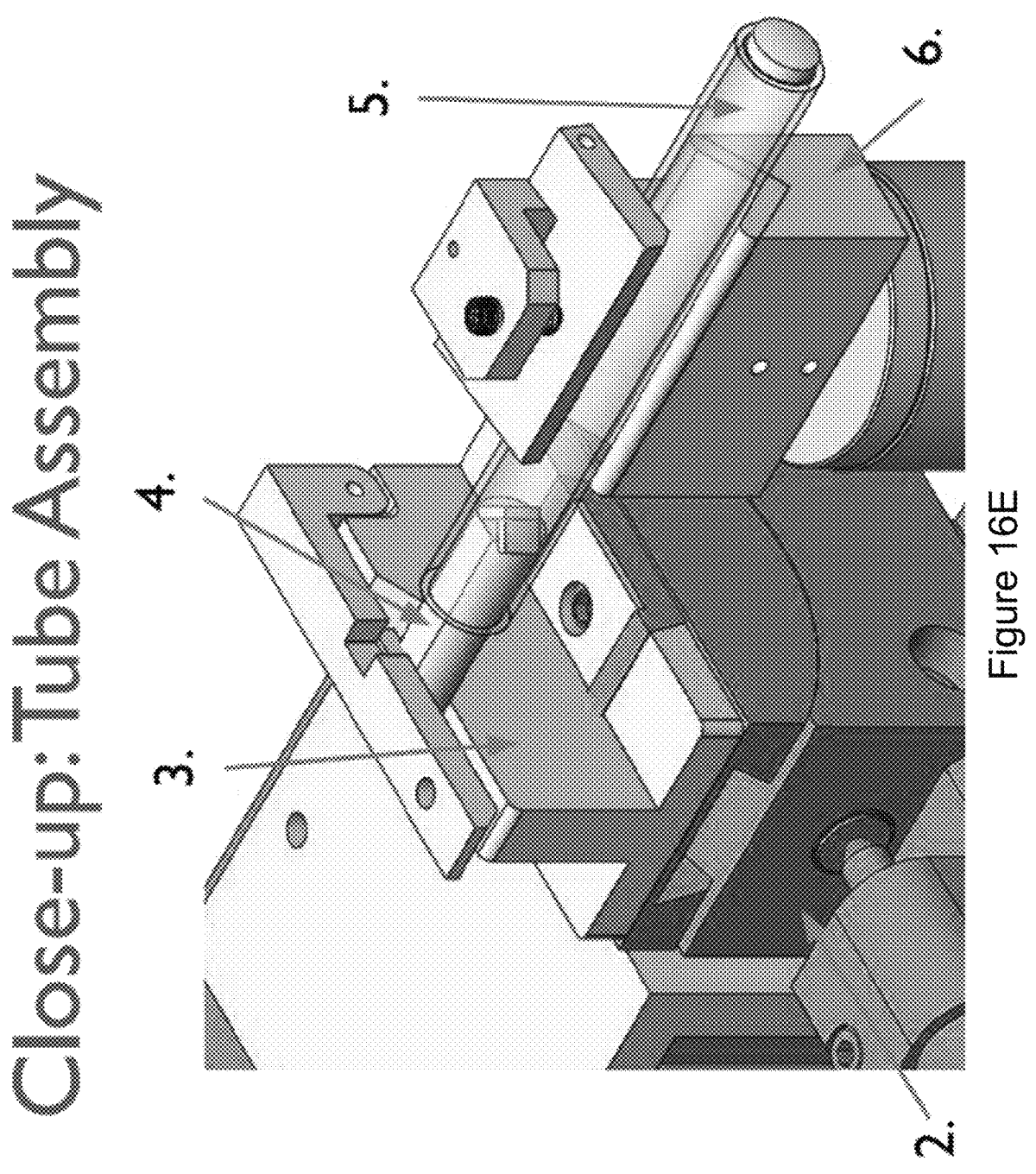
Figure 16F:
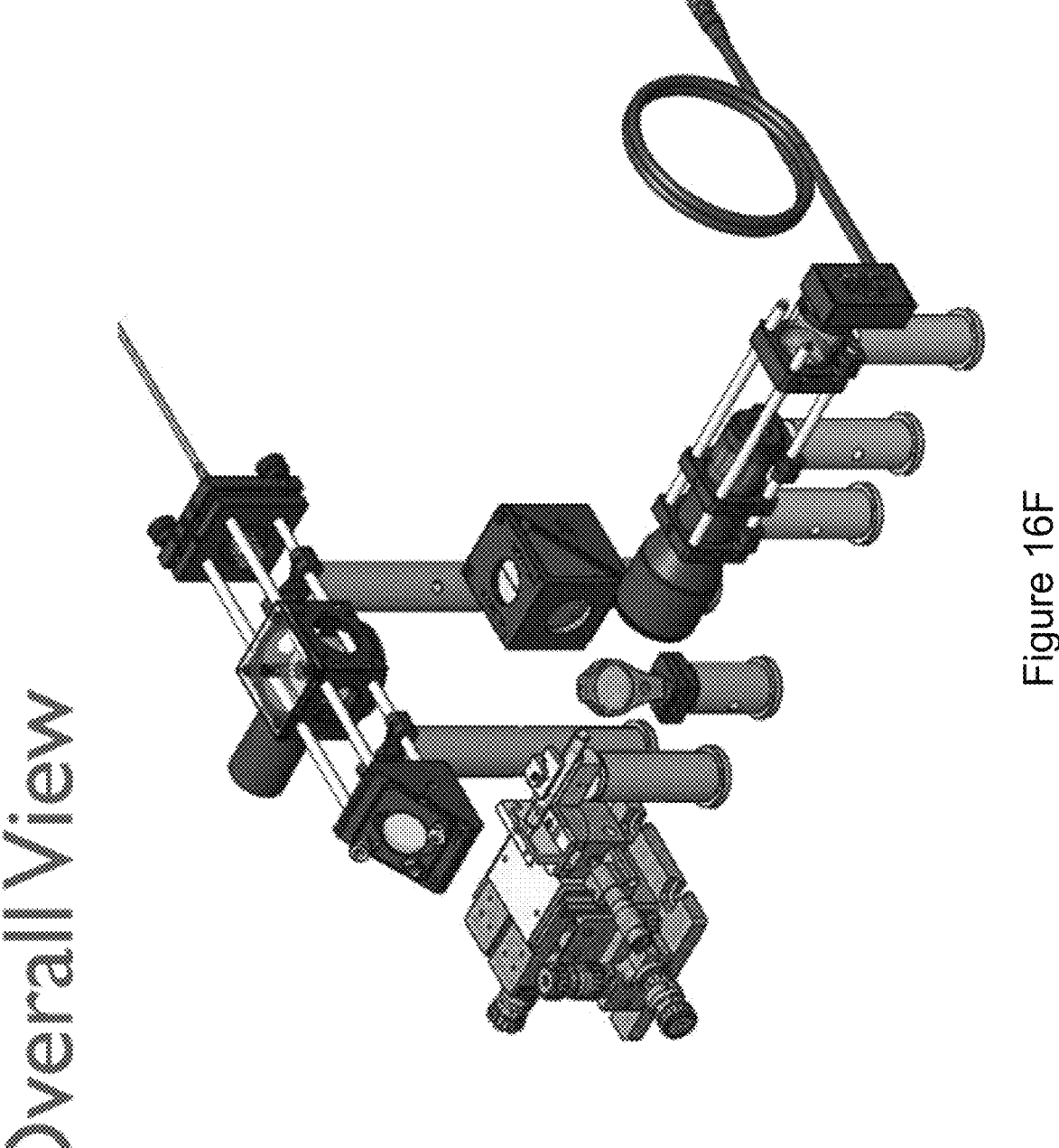
Figure 16G:
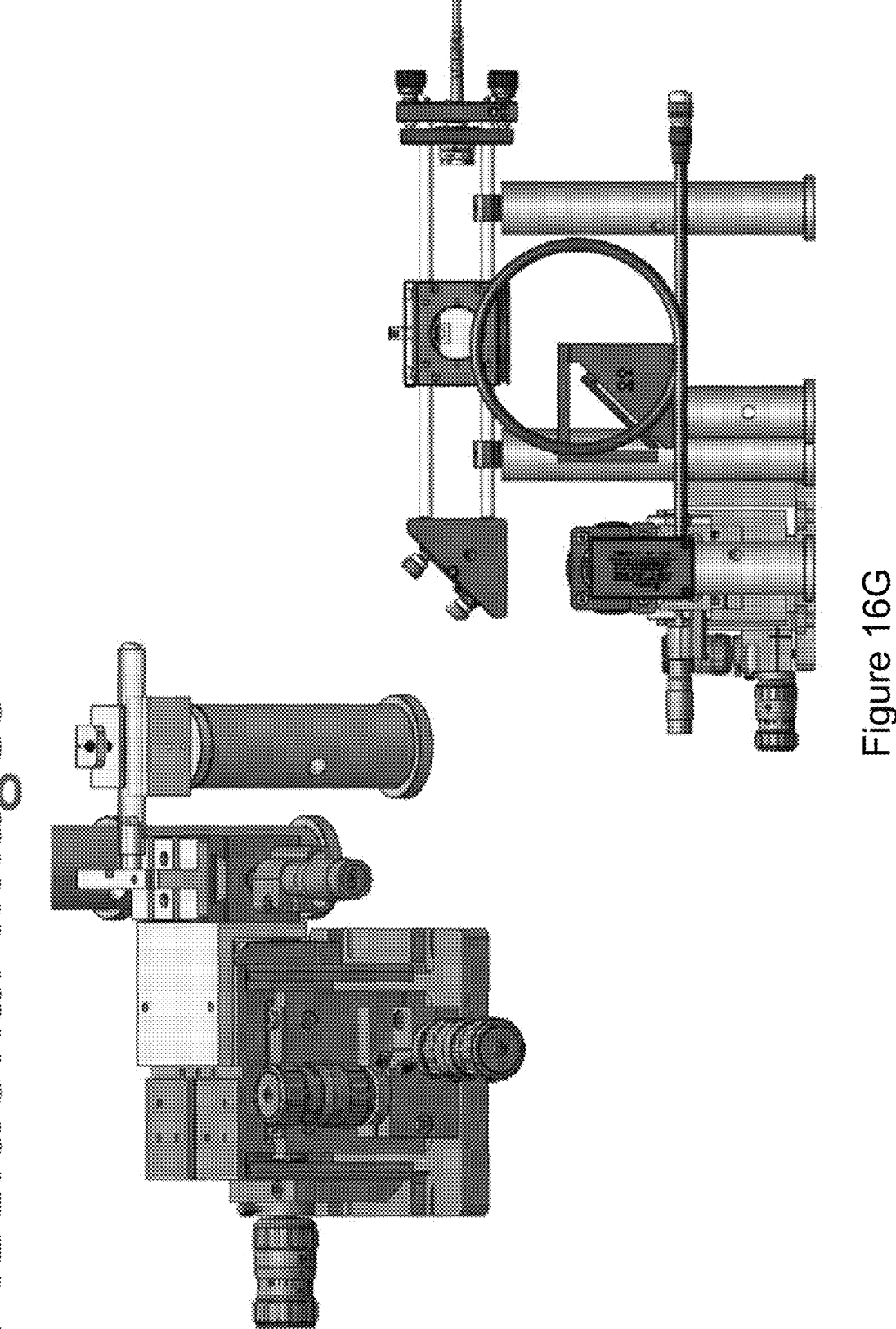

FIG. 16A depicts a block diagram of an alignment station usable for accurate alignment of a single channel fiber support with collimating lens in an exemplary embodiment. A level of measurement accuracy provided by the alignment station may be configured to a desired measurement accuracy level based on adjusting the distance between a camera and a v-groove mount on which the outer glass capillary tube is mounted, wherein the v-groove mount is aligned to the camera. Both the camera and the v-groove mount may be part of or mounted to a same structure which maintains the alignment between the camera and the v-groove mount.

FIGS. 16B-16G depict schematic diagrams of an exemplary implementation of the alignment station of FIG. 16A. In FIGS. 16B-16G, the following numbers correspond to the following elements: 1. Fiber alignment stage; 2. Goniometer stage; 3. V-block, dual-bore tube assembly holder; 4. Dual-bore tube assembly; 5. Collimation tube assembly; 6. V-block, collimation tube assembly holder; 7 mirror assembly on kinematic base, shearing interferometer; 8. Collimation indicator (shearing interferometer); 9. Telescope assembly; 10. Position detector (quadrant photodiode); 11. Alignment beam fiber input; 12. Alignment beam collimator; 13. Beam splitter; 14. Mirror assembly, alignment beam; 15. Beam target (ground glass diffuser).

Figure 17A:
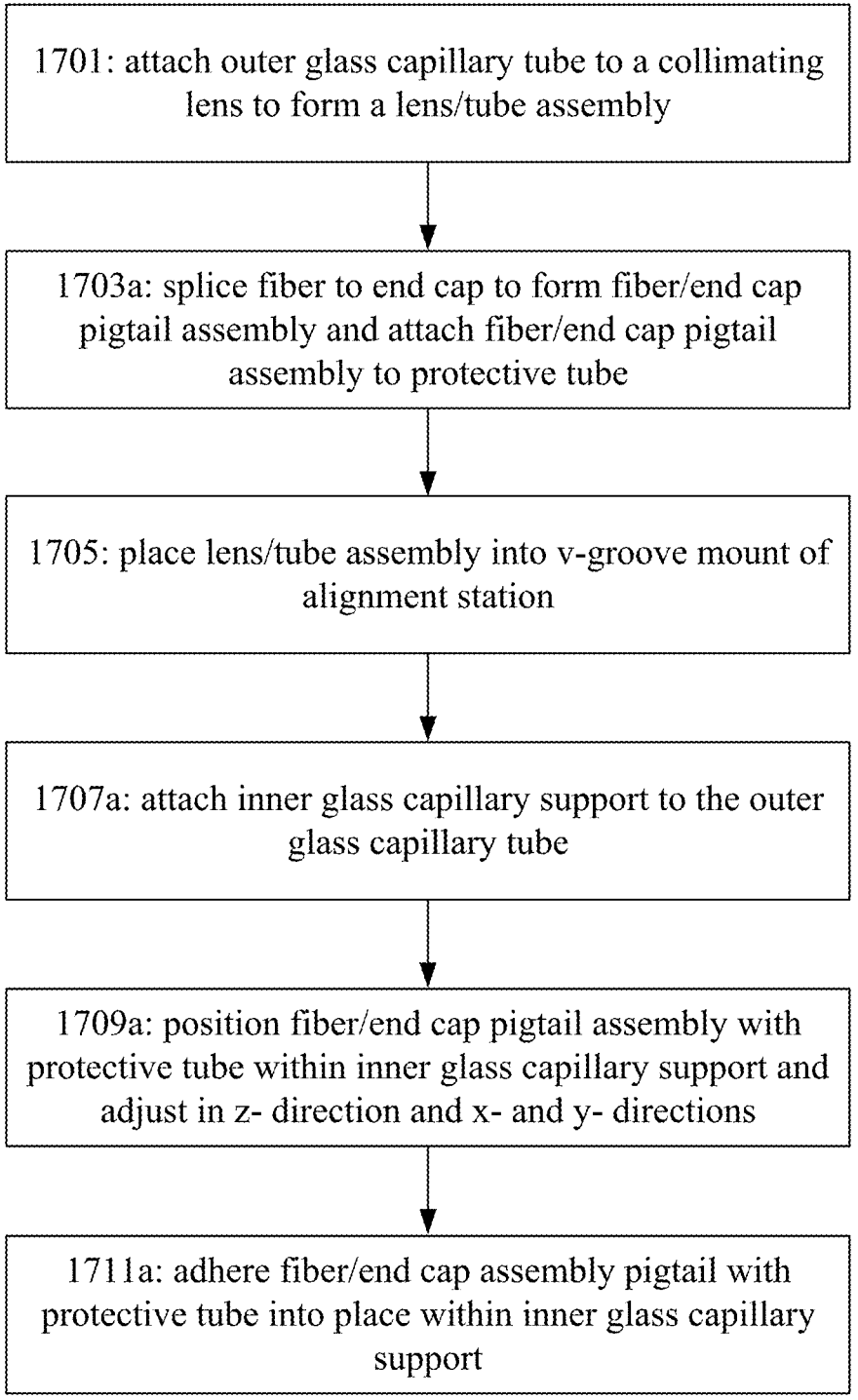

FIGS. 17A-17B are flowcharts depicting exemplary processes for alignment of a single channel fiber support. FIG. 17A depicts a process for alignment of a single channel fiber support with collimated assembly and is applicable, for example, to alignment and assembly of a structure as shown in FIGS. 14A and 15A-15B.

At stage 1701, an outer glass capillary tube (also called an "array reference capillary") is attached to a collimating lens to form a lens/tube assembly (e.g., a microlens or lenslet of a microlens or lenslet array). The capillary tube is created such that it has an outer diameter (OD) dimension to a tolerance of less than 2 um. This can be achieved using established techniques such as capillary tube drawing, grinding, etching and measurement plus selection to achieve a matched set of tubes equal to the number of laser outputs in the array. The collimating lens is selected to well-established parameters where the output beam diameter (as measured typically from the 1/e2 power point) is selected to achieve maximum diameter with minimum beam distortions caused by the diffractive effects on the beam caused by the interaction with the beam and the inner edge of capillary tube. In order to achieve low error collinearity of the beam with the center of the glass capillary tube, it is useful to "center" the lens with respect to the glass capillary tube as defined by the overlap of the line defined by the center of curvature of the lens to the line defined by the center of the glass capillary tube. Many methods may be used for achieving this centering function. In one example a low runout turn table and a point source microscope or alignment telescope are used. The alignment telescope sees a reflection from the lens and this reflection (typically a cross image or point of light) will precess as the lens/tube assembly is rotated the lens is translated relative to the tube and when the reflection image ceases to precess the lens is adhered to the tube. In other words, a lens centering technique may be used for the attachment of the outer glass capillary tube to the collimating lens. The attachment can be accomplished, for example, by the use of an alignment telescope and an air bearing rotational stage. The tube is placed in the chuck of the air bearing stage and then trued to make sure the tube rotates without any deviation in its rotation (this may include sending light which reflects off the lens, and when in focus a spot indicates that the light matches the lens, whereby rotating the lens causes the spot to precess, which stops when the lens is centered). The alignment telescope is aligned to the center of the rotating tube. A small vacuum is pulled to hold the lens on the tube. The focus point of the alignment telescope is then brought to coincide with the focal center of the lens. The lens/tube assembly is then rotated, and the lens is moved such that the reflection in the alignment telescope does not move. The lens is then attached to the tube via an adhesive.

At stage 1703a of FIG. 17A, a fiber is spliced to an end cap (e.g., a tapered end cap), for example, by using an active alignment process, to form a fiber/end cap pigtail assembly, and the fiber/end cap pigtail assembly is attached to a protective glass tube (also called a "fiber support tube"). The initial accuracy of such splice may be, for example, approximately 3 μm. The laser delivery fiber is spliced to the end cap in such a manner that the fiber is well centered into end cap. Because this splice can be fragile, the protective glass capillary tube is placed and bonded to the fiber and the end cap. It is desirable that all of the tubes in an assembly of multiple tubes be made up of a similar glass composition—for example, fused silica such that there is low absorption and subsequent assembly heating of any scattered light and the coefficient of thermal expansion is both low and uniform across the array.

At stage 1705, the lens/tube assembly formed at stage 1701 is placed into a v groove mount of an alignment station (e.g., as depicted in FIGS. 16A-16G) that is aligned to a camera. In other words, the lens/tube assembly is placed into a precision v block that is aligned with a position measuring optical detector. This position measuring may be, for example, a camera or a quad cell that outputs a number relative to the centroid position of the laser beam. The location of the position measuring optical detector is calibrated such that the line center of the lens/tube assembly is centered on the position measuring optical detector.

At stage 1707a, an inner glass capillary support (also called an "end cap support tube") is attached (e.g., glued) into an outer glass capillary tube (e.g., as depicted in FIGS. 14A and 15A-15B). In order to achieve an adhesive bond line on the order of 100-300 um, a series of glass capillaries can be nested within each other such that the desired bond lines are consistent with commercially available glass tubes.

At stage 1709a, the fiber/end cap pigtail assembly with protective glass tube is positioned within the inner glass capillary support, and is aligned using the camera of the alignment station (e.g., as depicted in FIG. 16A). The camera has beam centroid measurement software such that the center of the impinging beam can be measured to 0.1 μm accuracy. An accuracy of 0.1 μm over a 1 m distance is an angular accuracy of 0.1 μrad. The distance between the collimated assembly and the camera may be set to achieve a desired angular accuracy. Using the camera, the fiber/end cap pigtail assembly with protective glass tube is adjusted in the z direction to achieve a proper beam diameter on a camera screen readout (i.e., collimation), and is further adjusted in the x- and y-directions such that the calculated center on the camera screen readout is aligned to the correct place. The adjustments in the x-, y- and z-directions may be manually performed by hand, manually through use of a mounting structure which enables relatively more precise adjustments, and/or electronically through electronic control of a mounting structure. The adjustments in the x-, y- and z-directions for the fiber/end cap pigtail assembly with protective glass tube are performed based on grabbing (either by hand or through a mounting structure) the protective glass tube to which the fiber/end cap pigtail assembly is attached.

During the positioning and alignment process, the fiber/end cap pigtail assembly with its own protective glass capillary has light propagated through the fiber and out the end cap. The assembly is placed on a very precise multi-axis positioner such as a hexapod which can adjust the assembly in 6 axes. The light out of the fiber/end cap pigtail assembly is directed to the positioning measuring optical detector which has been calibrated such that an "aim point" is created and the fiber/end cap pigtail assembly is aligned such that the resulting beam is moved in x, y and z such that a desired placement of the laser beam on the position measuring optical detector is achieved.

At stage 1711a, the aligned fiber/end cap assembly pigtail with protective glass tube is adhered into place relative to the inner glass capillary support to ensure a thermally stable mount. In other words, the aligned fiber/end cap assembly with its protective glass tube is adhered into the inner capillary support/glass tube/lens assembly to create a collimated laser beam assembly where the beam is highly collinear to the axis of the glass capillary tube. A number of ways may be utilized to adhere the fiber/end cap assembly pigtail with protective glass tube into place, including, for example, through the use of glue.

FIG. 17B depicts another process for alignment of a single channel fiber support with collimated assembly and is applicable, for example, to alignment and assembly of a structure as shown in FIGS. 11 and 14B-14C.

Stage 1701 of FIG. 17B is similar to stage 1701 of FIG. 17A.

At stage 1703b, a fiber is spliced to a tapered end cap, and the fiber with the tapered end cap is centered in the center of a tube (e.g., a double core capillary tube which serves as an inner glass capillary support). Pump light is directed into the end of the fiber with the tapered end cap based on also providing a pump fiber, a pump taper (whereby the pump taper increases the diameter of the pump beam and correspondingly reduces the NA of the pump beam), and a reflector (e.g., dichroic folded mirror) within the tube. The fiber with tapered end cap, the pump fiber with pump taper, and the reflector form a counter-pumped tapered end cap assembly is formed. A fixture is used to provide the folded mirror and position it relative to the two fibers. The components are then fixed relative to one another, and a counter-pumped tube assembly (also referred to herein as a CPTEC) is formed by the fiber with tapered end cap, the pump fiber with pump taper, and the reflector.

Stage 1705 of FIG. 17B is similar to stage 1705 of FIG. 17A.

At stage 1709b, the counter-pumped tube assembly is placed within the lens/tube assembly while the lens/tube assembly is on the alignment station, and alignment of light output from the fiber with tapered end cap is performed in a manner similar as discussed above in connection with stage 1709a of FIG. 17A.

At stage 1711b, once aligned, the counter-pumped tube assembly is adhered into place within the lens/tube assembly.

A master reference assembly can be created to create an "aiming spot on the camera" that all other future assemblies are aligned to. The master assembly is placed into a setup to record a reference number, and then other assemblies are aligned using the reference provided by the master assembly.

It will be appreciated that the certain steps discussed above may occur independently of one another (and thus may be performed in any order or simultaneously). For example, the splicing of the fiber to the end cap at stage 1703a may be performed independently of the attachment of the outer glass capillary tube to the collimating lens at stage 1701. Similarly, the attachment of the outer glass capillary tube to the collimating lens at stage 1701 may be performed independently of the attachment of the inner glass capillary support into the outer glass capillary tube at stage 1707a.

It will be appreciated that the number of concentric tubes used in each respective embodiment may vary. For example, the embodiments depicted in FIGS. 14A and 15A-15B utilize three concentric glass tubes, but other embodiments may utilize less than three or more than three tubes (e.g., depending on the desired outer circumference of the laser channel and how much space between tubes is filled with adhesive). To provide another example, the embodiments depicted in FIGS. 11 and 14B-14C utilize two glass tubes (the first glass tube being an outer glass capillary tube and the second glass tube being a glass rod having two bores), but more than two glass tubes may be used in other embodiments.

A plurality of tubes may be manufactured such that the outer diameters of all the tubes are substantially the same (e.g., in an exemplary implementation, the outer diameter dimensional tolerance may be less than 5 μm). For each tube, according to the alignment process discussed above, a respective lens may be centered on the tube, and a respective fiber may be aligned (in the x-, y- and z-directions) and fastened within the tube such that the collimated beam corresponding to the tube is colinear to the axis of the tube with high accuracy (e.g., to μrad accuracies). Because each of the outer glass capillary tubes can be manufactured with a highly accurate diameter, and each fiber is aligned to be collinear to the center line of the tube, the tubes can be easily stacked together to form an array (such as a V-groove array, a square array, or a hexagonal array) for either tiling or diffractive optical element (DOE) coherent beam combining. For example, in an exemplary implementation, a tolerance of less than 0.1 mrad may be achieved such that the tubes can simply be stacked in a precision V groove fixture to create an aligned array. In other embodiments, other array shapes can be created, including, for example, square or hexagonal arrays. Linear arrays may also be used, for example, for applications where beams are combined by wavelength.

Figure 18A:
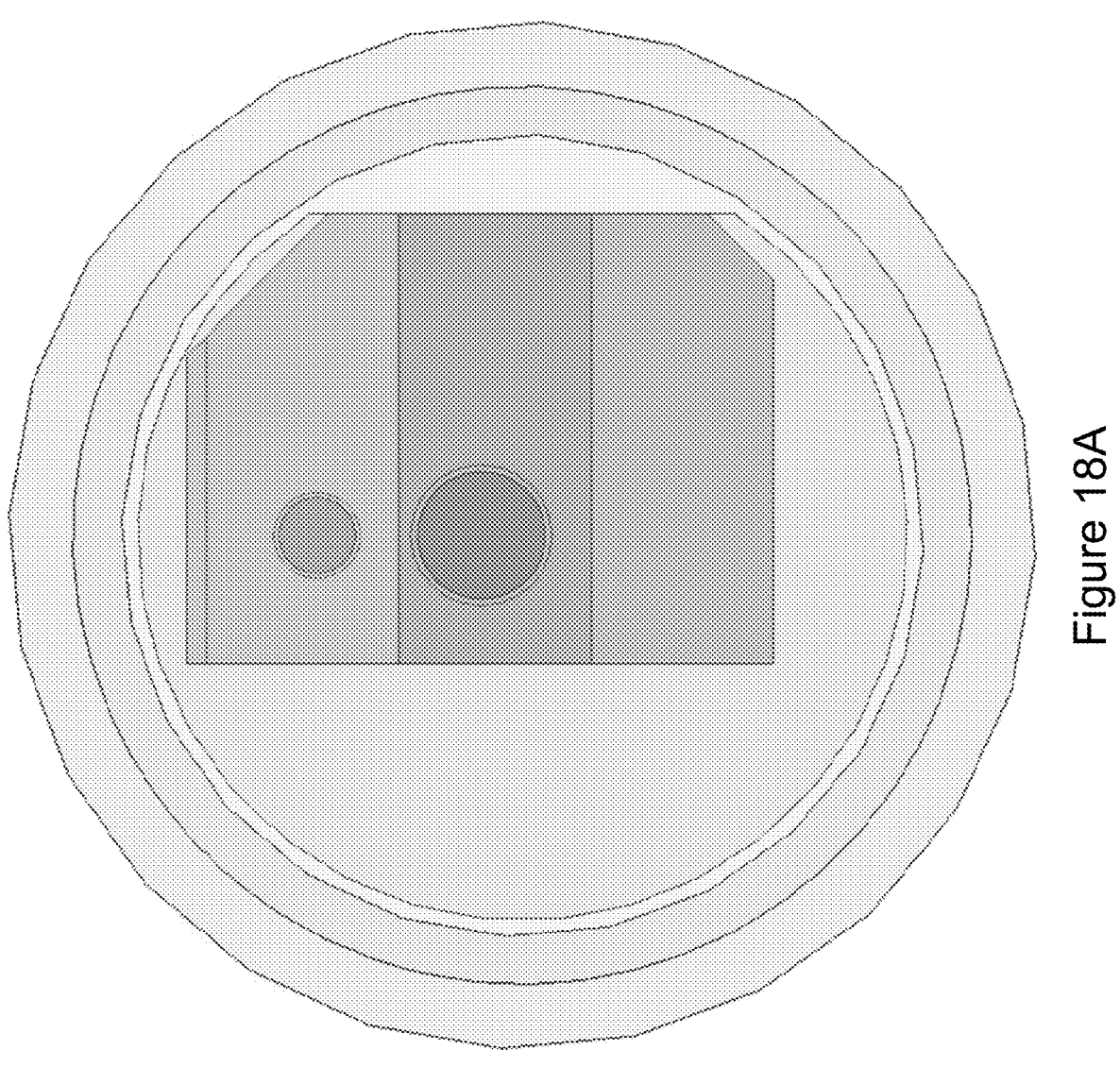
FIG. 18A depicts a front view of a single channel CPTEC assembly in an exemplary embodiment.

FIG. 18A depicts a front view of a single channel CPTEC assembly within a fiber support assembly in an exemplary embodiment. In this example, the center fiber (i.e., the signal fiber) is slightly off-center due to translation of the beam through the glass, but the beam output by the center fiber is centered.

Figure 18B:
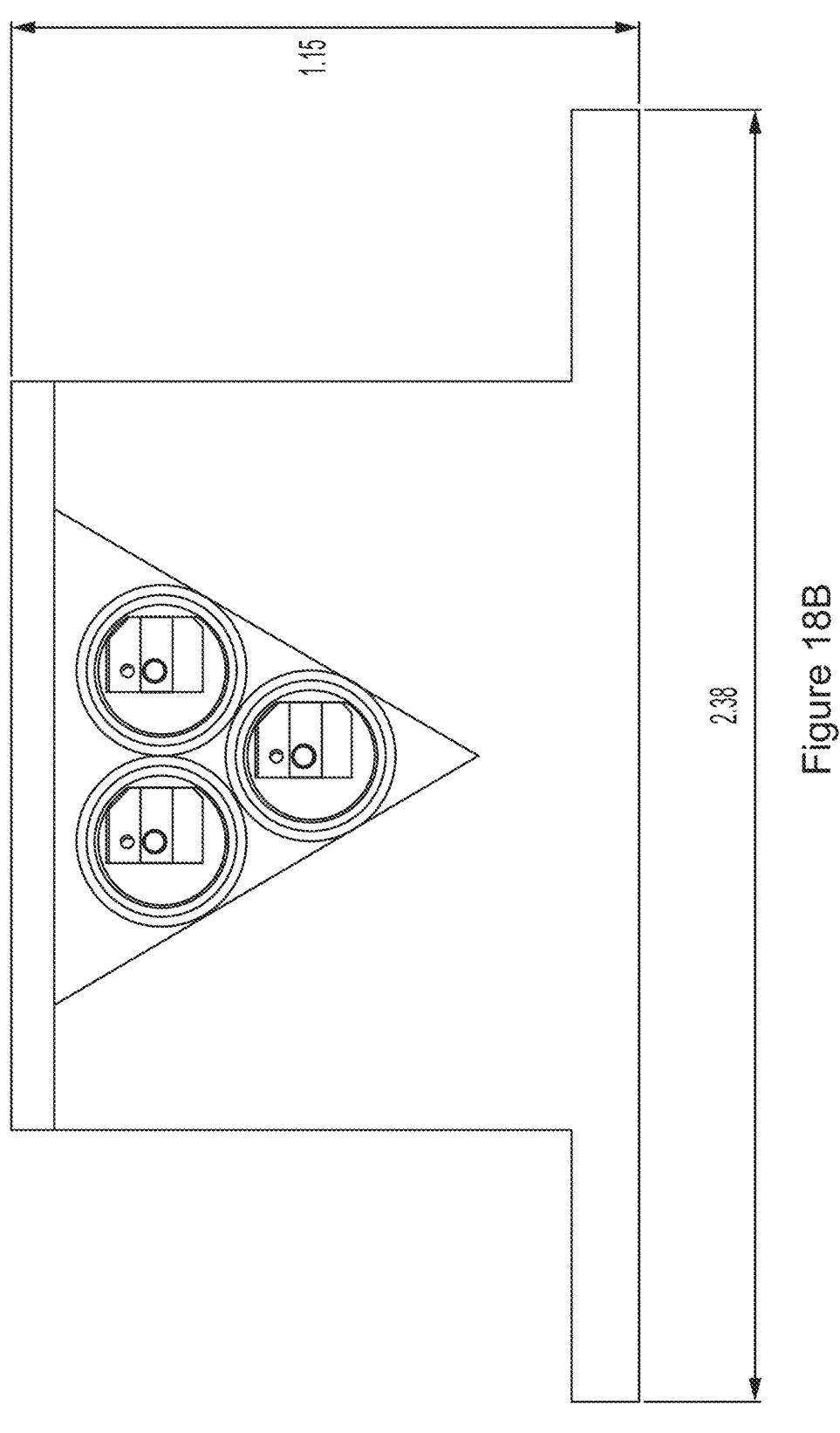
FIGS. 18B-18D depict an exemplary triangular array of three CPTEC assemblies in a V-groove.
Figure 18C:
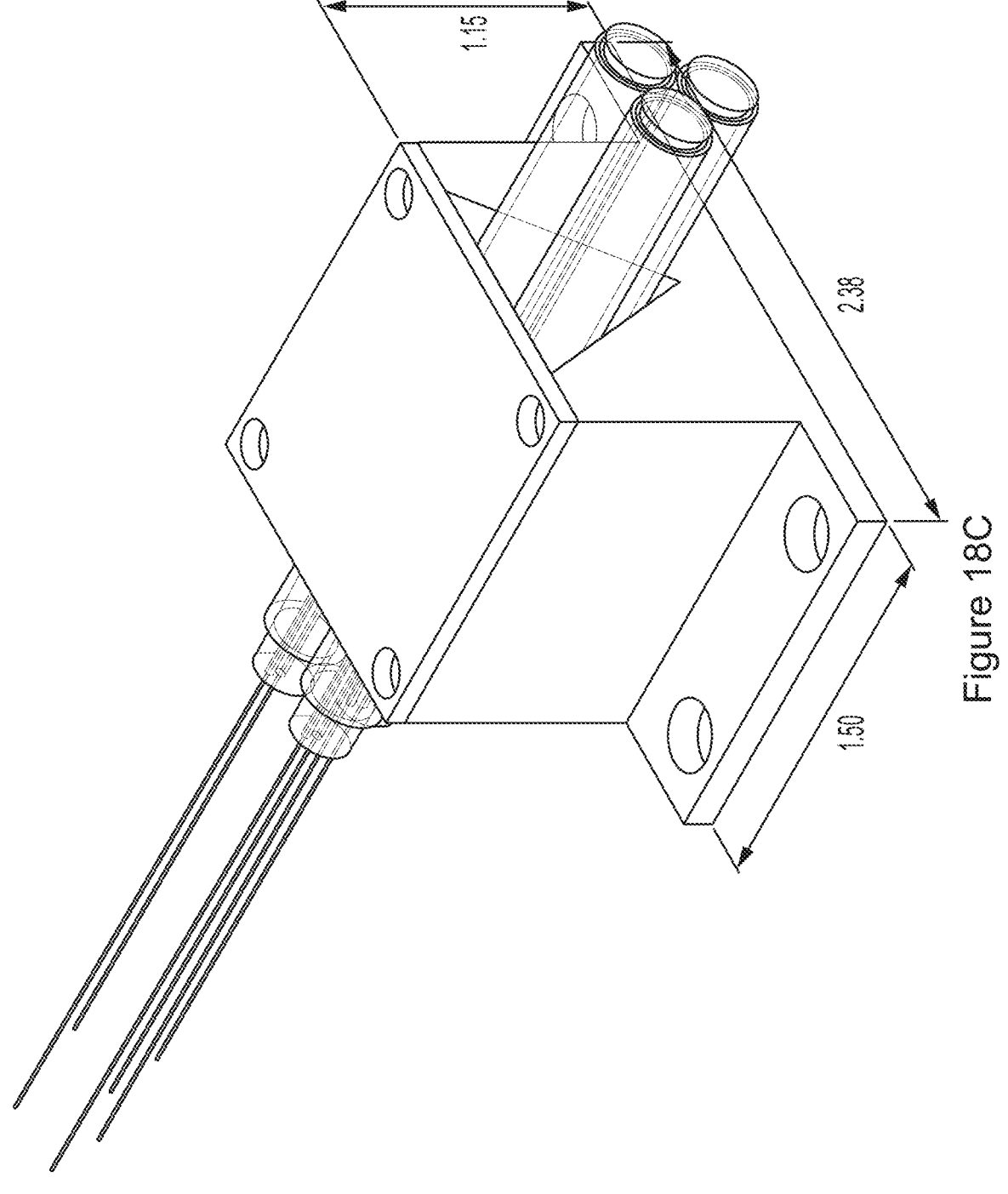
Figure 18D:
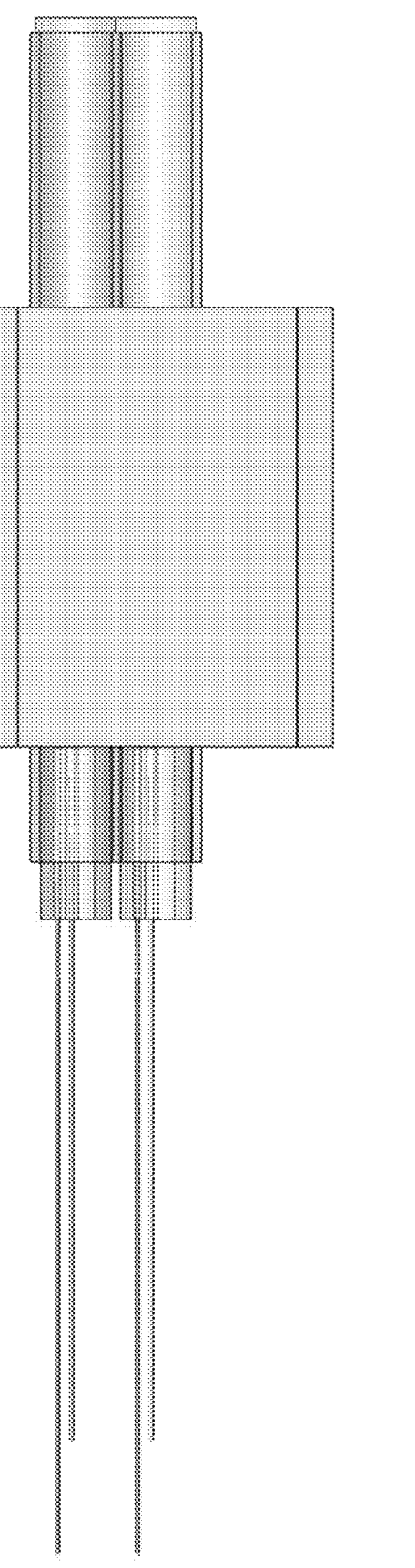
Figure 19A:
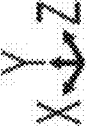
FIGS. 19A-19B are schematic illustrations depicting examples of hexagonal arrays in exemplary embodiments.
Figure 19B:
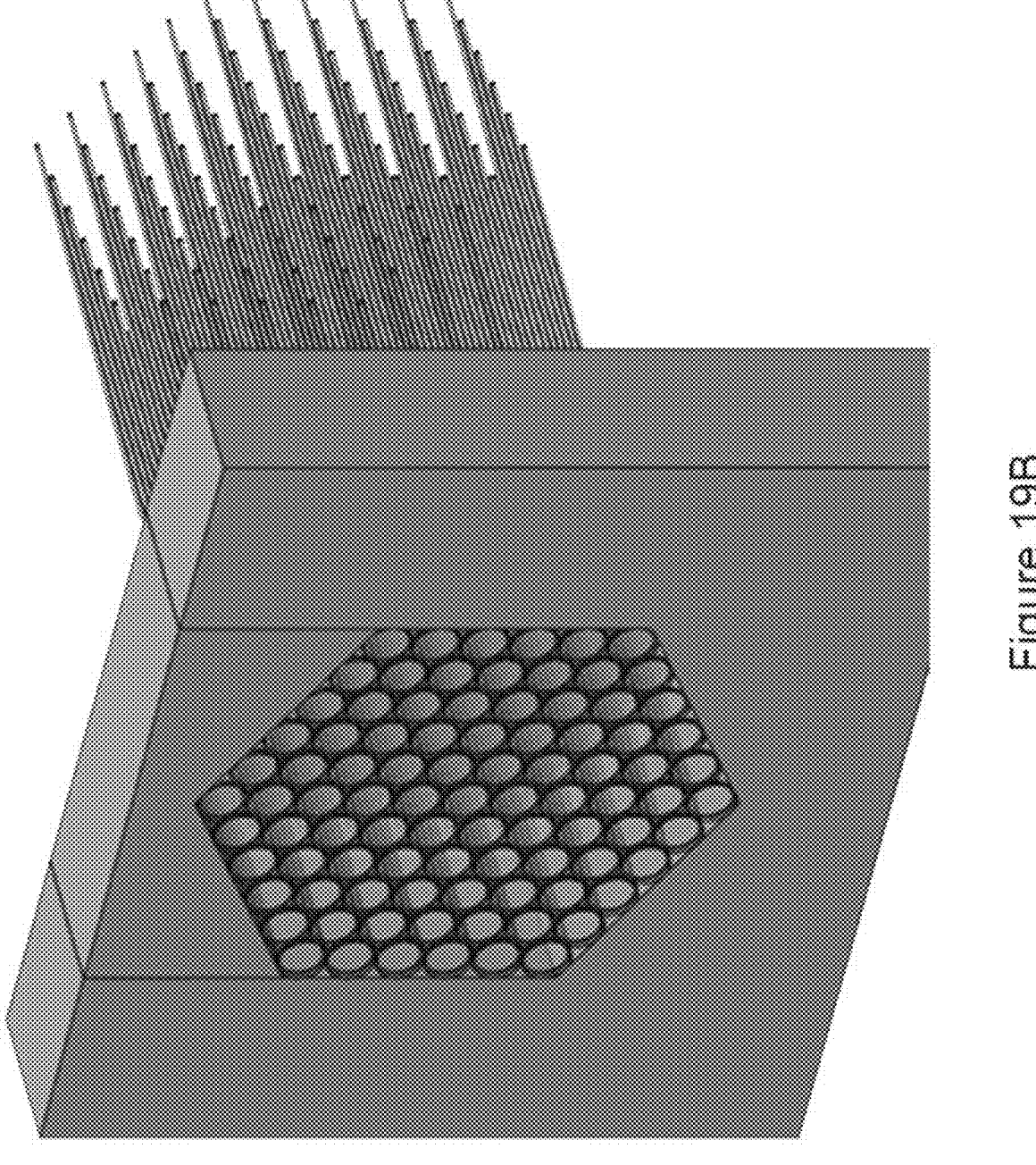
Figure 20A:
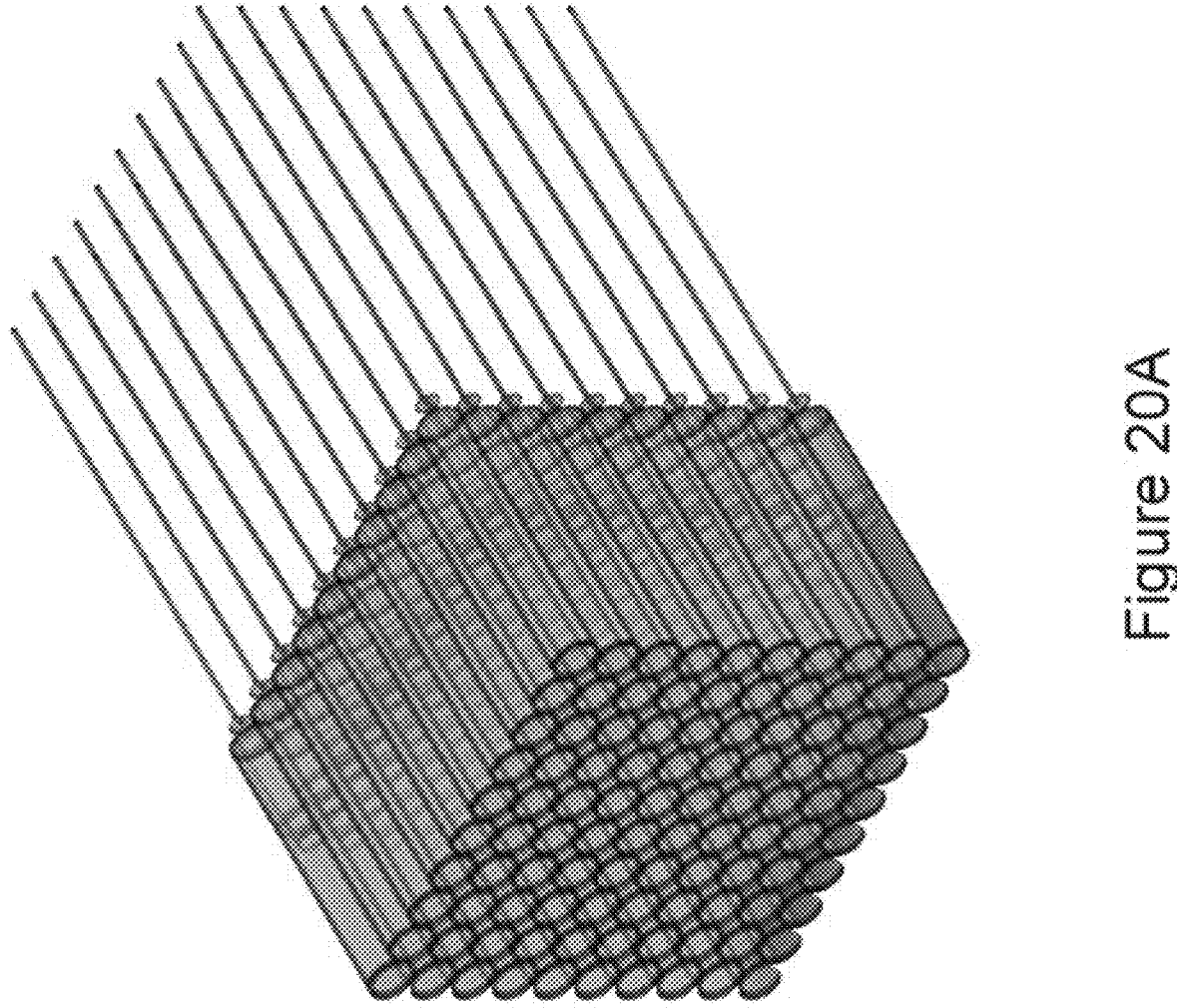
FIGS. 20A-20B are schematic illustrations depicting examples of square arrays in exemplary embodiments.
Figure 20B:
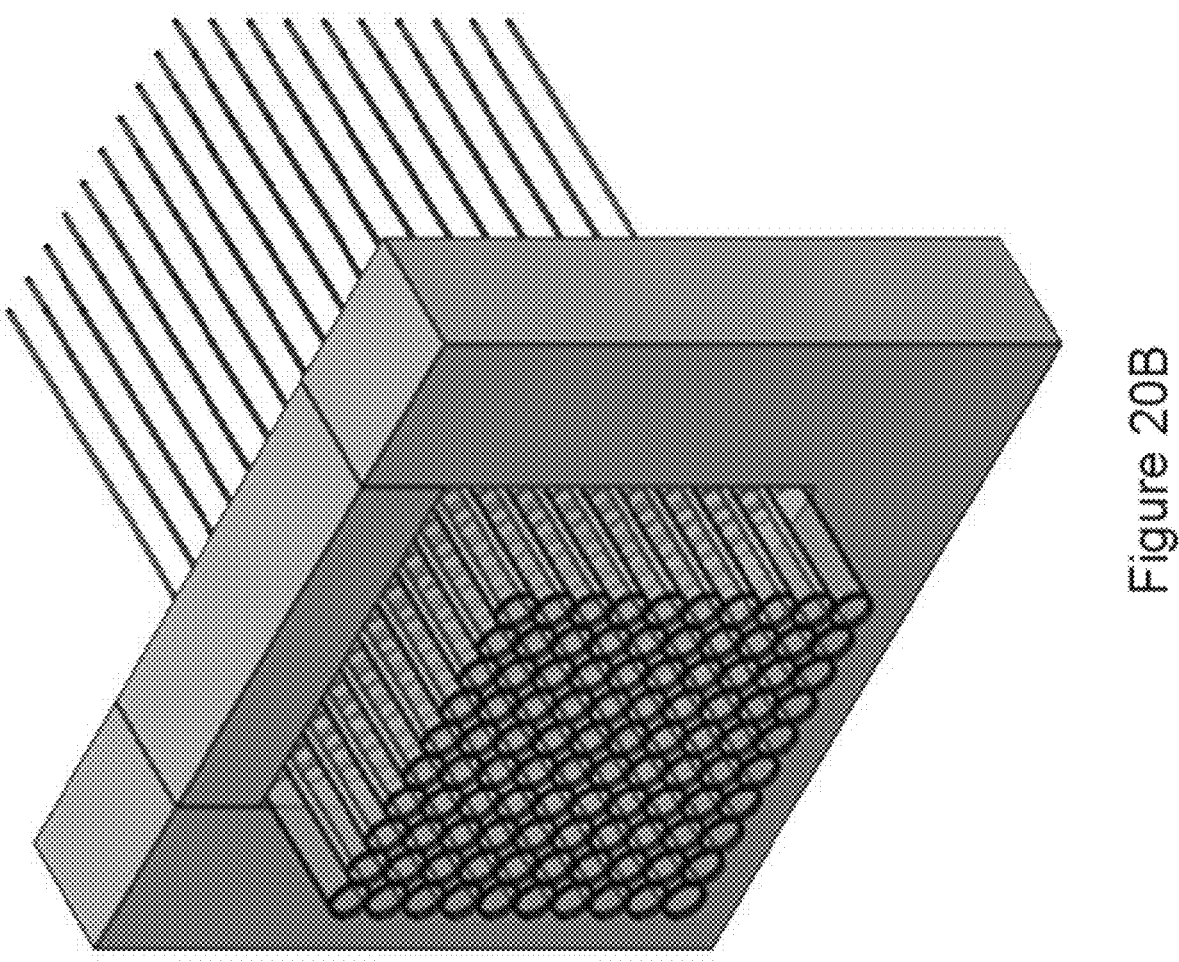

While fiber lasers in many circumstances can provide high average powers in robust and small enclosures, they are limited in terms of the available peak power due to fiber non-linearities which can severely degrade performance. To overcome this, multiple fiber lasers can be spectrally or coherently combined into an array. FIGS. 18B-18D depict an exemplary triangular array of three CPTEC assemblies within respective fiber support assemblies in a V-groove, FIGS. 19A-19B are schematic illustrations depicting examples of hexagonal arrays (for beam "tiling," hexagonal arrays are often preferred), and FIGS. 20A-20B are schematic illustrations depicting examples of square arrays (for interferometric combining, square arrays are often preferred). The assemblies shown in FIGS. 18B-D, FIGS. 19A-19B, and FIGS. 20A-20B provide for a robust method of creating counterpumped lasers and putting these lasers into a tightly packed array without individual adjustments. This is advantageous over conventional manners of forming laser arrays in which each fiber laser is placed on its own precision adjustable mount (which is costly, bulky, and prone to drifting out of alignment).

In further exemplary embodiments, the fiber support assemblies in an array may be individually rotated to provide for individual and independent control over linear polarization rotation for each respective fiber support assembly. In one example, rod bearings (e.g., made of Teflon) may be disposed between respective fiber support assemblies to allow for rotation. In another example, the outer glass capillary tubes may be coated (e.g., with CVD diamond coating) to allow for tube rotation. In yet another example, a mechanical flexure may be extended in the back to provide for rotation. In yet another example, a half-wave plate may be provided for each fiber support assembly, wherein the half-wave plate is disposed on a shaft and/or gear to provide for rotation of the half-wave plate.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fiber support assembly, comprising:
   a first glass tube, wherein the first glass tube is attached to a microlens or lenslet of a microlens or lenslet array;
   a second glass tube at least partially disposed within the first glass tube; and
   a gain fiber disposed within the second glass tube, wherein the gain fiber has a first tapered end cap, and wherein the gain fiber with the first tapered end cap is aligned to the microlens or lenslet attached to the first glass tube;
   wherein the first tapered end cap has an outer diameter that increases from one end of the first tapered end cap to another end of the first tapered end cap, and wherein the first tapered end cap is configured to receive counter-pumping light.

2. The fiber support assembly according to claim 1, further comprising:
   a third glass tube disposed between the first glass tube and the second glass tube.

3. The fiber support assembly according to claim 1, further comprising:
   a pump fiber disposed within the second glass tube, wherein the pump fiber has a second tapered end cap; and
   a reflector configured to receive the counter-pumping light from the pump fiber and direct the counter-pumping light to the first tapered end cap of the gain fiber.

4. The fiber support assembly according to claim 3, wherein the reflector is a dichroic mirror.

5. The fiber support assembly according to claim 1, wherein the gain fiber is adjustable for alignment based on movement of the second glass tube relative to the first glass tube.

6. The fiber support assembly according to claim 5, wherein the gain fiber is configured to be aligned to the microlens or lenslet using an alignment station with a camera.

7. A system, comprising:

a microlens or lenslet array; and a plurality of fiber support assemblies, wherein each fiber support assembly of the plurality of fiber support assemblies comprises:

a first glass tube, wherein the first glass tube is attached to a respective microlens or lenslet of the microlens or lenslet array;

a second glass tube at least partially disposed within the first glass tube; and a gain fiber disposed within the second glass tube, wherein the gain fiber has a first tapered end cap, and wherein the gain fiber with the first tapered end cap is aligned to the respective microlens or lenslet attached to the first glass tube.

8. The system according to claim 7, wherein each fiber support assembly of the plurality of fiber support assemblies further comprises:

a pump fiber disposed within the second glass tube, wherein the pump fiber has a second tapered end cap; and a reflector configured to receive counter-pumping light from the pump fiber and direct the counter-pumping light to the first tapered end cap of the gain fiber.

9. The system according to claim 7, further comprising:

a respective seed or source, a respective amplifier front end, and one or more respective mode adapters connected to a respective gain fiber.

10. The system according to claim 7, further comprising:

a respective counter-pumping source connected to a respective pump fiber.

11. The system according to claim 7, wherein the plurality of fiber support assemblies are disposed in a triangular array.

12. The system according to claim 11, further comprising:

a v-groove support structure configured to hold the triangular array of fiber support assemblies.

13. The system according to claim 7, wherein the plurality of fiber support assemblies are disposed in a hexagonal array or a square array.

14. The system according to claim 7, wherein the plurality of fiber support assemblies are stacked on one another to form an aligned array of fiber support assemblies.

15. A fiber support assembly, comprising:

a first glass tube, wherein the first glass tube is attached to a microlens or lenslet of a microlens or lenslet array;

a second glass tube at least partially disposed within the first glass tube; and a gain fiber disposed within the second glass tube, wherein the gain fiber has a first tapered end cap, and wherein the gain fiber with the first tapered end cap is aligned to the microlens or lenslet attached to the first glass tube;

wherein the fiber support assembly further comprises:

a pump fiber disposed within the second glass tube, wherein the pump fiber has a second tapered end cap; and a reflector configured to receive counter-pumping light from the pump fiber and direct the counter-pumping light to the first tapered end cap of the gain fiber.

16. The fiber support assembly according to claim 15, further comprising:

a third glass tube disposed between the first glass tube and the second glass tube.

17. The fiber support assembly according to claim 15, wherein the reflector is a dichroic mirror.

18. The fiber support assembly according to claim 15, wherein the gain fiber is adjustable for alignment based on movement of the second glass tube relative to the first glass tube.

19. The fiber support assembly according to claim 18, wherein the gain fiber is configured to be aligned to the microlens or lenslet using an alignment station with a camera.

20. The fiber support assembly according to claim 15, wherein the first tapered end cap has an outer diameter that increases from one end of the first tapered end cap to another end of the first tapered end cap, and wherein the first tapered end cap is configured to receive the counter-pumping light.

\* \* \* \* \*